US 12,025,063 B2

(12) United States Patent
Guglielmo et al.

(10) Patent No.: US 12,025,063 B2
(45) Date of Patent: Jul. 2, 2024

(54) NATURAL GAS ENGINES WITH FUEL QUALITY DETERMINATION

(71) Applicant: Inpro/Seal LLC, Rock Island, IL (US)

(72) Inventors: Kennon Guglielmo, San Antonio, TX (US); Justin H. Sanders, San Antonio, TX (US); Michael T. Hambidge, San Antonio, TX (US); Timothy J. Westerdale, San Antonio, TX (US); James Cole, Helotes, TX (US); Chad Stovell, San Antonio, TX (US); Timothy J. Barton, San Antonio, TX (US)

(73) Assignee: Inpro/Seal LLC, Rock Island, IL (US)

( * ) Notice: Subject to any disclaimer, the term of this patent is extended or adjusted under 35 U.S.C. 154(b) by 0 days.

(21) Appl. No.: 17/935,229

(22) Filed: Sep. 26, 2022

(65) Prior Publication Data
US 2024/0110525 A1    Apr. 4, 2024

Related U.S. Application Data

(63) Continuation-in-part of application No. 17/905,341, filed as application No. PCT/US2021/020557 on Mar. 2, 2021, now Pat. No. 11,859,568.
(Continued)

(51) Int. Cl.
*F02P 19/00* (2006.01)
*F02D 19/02* (2006.01)
*F02P 5/145* (2006.01)

(52) U.S. Cl.
CPC ......... *F02D 19/027* (2013.01); *F02D 19/023* (2013.01); *F02D 19/029* (2013.01); *F02P 5/145* (2013.01)

(58) Field of Classification Search
CPC .... F02D 19/027; F02D 19/023; F02D 19/029; F02D 19/0642; F02D 41/0027; F02P 5/145
See application file for complete search history.

(56) References Cited

U.S. PATENT DOCUMENTS

| 2,475,086 A | 7/1949 | Ensign |
|---|---|---|
| 2,781,752 A | 2/1957 | Van Den Bussche |
| (Continued) | | |

FOREIGN PATENT DOCUMENTS

| CN | 101535620 B | 12/2012 |
|---|---|---|
| CN | 102192023 B | 9/2014 |
| (Continued) | | |

OTHER PUBLICATIONS

Bosch Engineering GmbH, "Bosch Motorsport, Electronic Throttle Body" specification sheet 510487 15, pp. 1-3, en, V, 20, Jul. 2020.
(Continued)

*Primary Examiner* — Sizo B Vilakazi
*Assistant Examiner* — Sherman D Manley
(74) *Attorney, Agent, or Firm* — Fish & Richardson P.C.

(57) ABSTRACT

A system for determining properties of fuel supplied to an internal combustion (IC) engine and for adjusting operations of the IC engine based on the determined properties. The system includes an air-flow throttle configured to control the air supplied to the IC engine; a fuel-flow throttle configured to control the fuel supplied to the IC engine; and an engine control module (ECM) configured to receive readings from and control operation of the throttles. The ECM is configured to perform a fuel-air determination program where the ECM determines a percent-error air-to-fuel ratio (AF) based on a true AF ratio compared to an ideal AF ratio. The ECM is configured to perform a fuel property determination and adjustment program in which the ECM is configured to
(Continued)

adjust operations of the IC engine based on a fuel property value determined using the percent-error AF ratio.

20 Claims, 20 Drawing Sheets

Related U.S. Application Data

(60) Provisional application No. 62/983,840, filed on Mar. 2, 2020.

(56) References Cited

U.S. PATENT DOCUMENTS

| | | | |
|---|---|---|---|
| 4,089,173 A | 5/1978 | Melchior | |
| 4,197,822 A | 4/1980 | Tsiang | |
| 4,418,673 A | 12/1983 | Tominari | |
| 4,434,778 A | 3/1984 | Morita | |
| 4,524,745 A | 6/1985 | Tominari et al. | |
| 5,720,258 A | 2/1998 | Tolkacz et al. | |
| 5,755,254 A | 5/1998 | Carter et al. | |
| 5,868,159 A | 2/1999 | Loan et al. | |
| 5,873,351 A | 2/1999 | Vars et al. | |
| 6,016,832 A | 1/2000 | Vars et al. | |
| 6,978,774 B2 * | 12/2005 | Fisher | F02D 41/0027 123/681 |
| 7,032,569 B2 | 4/2006 | Ikeda et al. | |
| 8,176,897 B1 * | 5/2012 | Guglielmo | F02M 21/0239 123/458 |
| 9,957,920 B2 | 5/2018 | Walser et al. | |
| 10,316,797 B2 | 6/2019 | Walser et al. | |
| 11,073,122 B2 * | 7/2021 | Burns | F02M 19/08 |
| 2001/0032628 A1 | 10/2001 | Goto et al. | |
| 2002/0083980 A1 | 7/2002 | Nakajima et al. | |
| 2004/0231644 A1 | 11/2004 | Ikeda et al. | |
| 2007/0143007 A1 | 6/2007 | Durand | |
| 2008/0284451 A1 | 11/2008 | Binder et al. | |
| 2009/0071438 A1 * | 3/2009 | Shiraishi | F02D 31/002 123/403 |
| 2009/0076709 A1 * | 3/2009 | Shiraishi | F02D 41/0027 701/103 |
| 2009/0088950 A1 * | 4/2009 | Fisher | F02M 21/047 261/78.1 |
| 2009/0183716 A1 | 7/2009 | Kojima et al. | |
| 2010/0089364 A1 | 4/2010 | Flanagan et al. | |
| 2011/0093182 A1 | 4/2011 | Weber | |
| 2011/0186013 A1 | 8/2011 | Sasaki | |
| 2012/0046886 A1 | 2/2012 | Bowling et al. | |
| 2012/0078487 A1 | 3/2012 | Light-Holets | |
| 2012/0111307 A1 | 5/2012 | Hagen | |
| 2013/0255638 A1 | 10/2013 | Takagi et al. | |
| 2013/0333671 A1 * | 12/2013 | Walser | F02D 41/0027 123/480 |
| 2014/0305406 A1 | 10/2014 | Pursifull | |
| 2015/0096533 A1 | 4/2015 | Hiramoto et al. | |
| 2015/0377161 A1 | 12/2015 | Smith et al. | |
| 2016/0138447 A1 | 5/2016 | Martin | |
| 2016/0265469 A1 | 9/2016 | Harada | |
| 2019/0293027 A1 | 9/2019 | Walser et al. | |
| 2020/0408155 A1 * | 12/2020 | Sanders | F02D 9/105 |
| 2022/0127996 A1 | 4/2022 | Pekar | |

FOREIGN PATENT DOCUMENTS

| | | |
|---|---|---|
| CN | 104514639 A | 4/2015 |
| CN | 104847508 A | 8/2015 |
| DE | 4140353 | 6/1992 |
| DE | 10346983 | 5/2005 |
| DE | 102008034581 A1 | 1/2009 |
| EP | 2208875 | 7/2010 |
| GB | 2252641 A | 8/1992 |
| WO | 2007077049 A1 | 7/2007 |
| WO | 2012053192 A1 | 4/2012 |
| WO | 2013192331 A1 | 7/2014 |
| WO | 2017164801 A1 | 9/2017 |
| WO | 2018022746 A1 | 2/2018 |
| WO | 2018210443 A1 | 11/2018 |
| WO | WO 2019169201 | 9/2019 |

OTHER PUBLICATIONS

International Search Report and Written Opinion in International Appln. No. PCT/US2021/020557, mailed on Mar. 22, 2021, 19 pages.

* cited by examiner

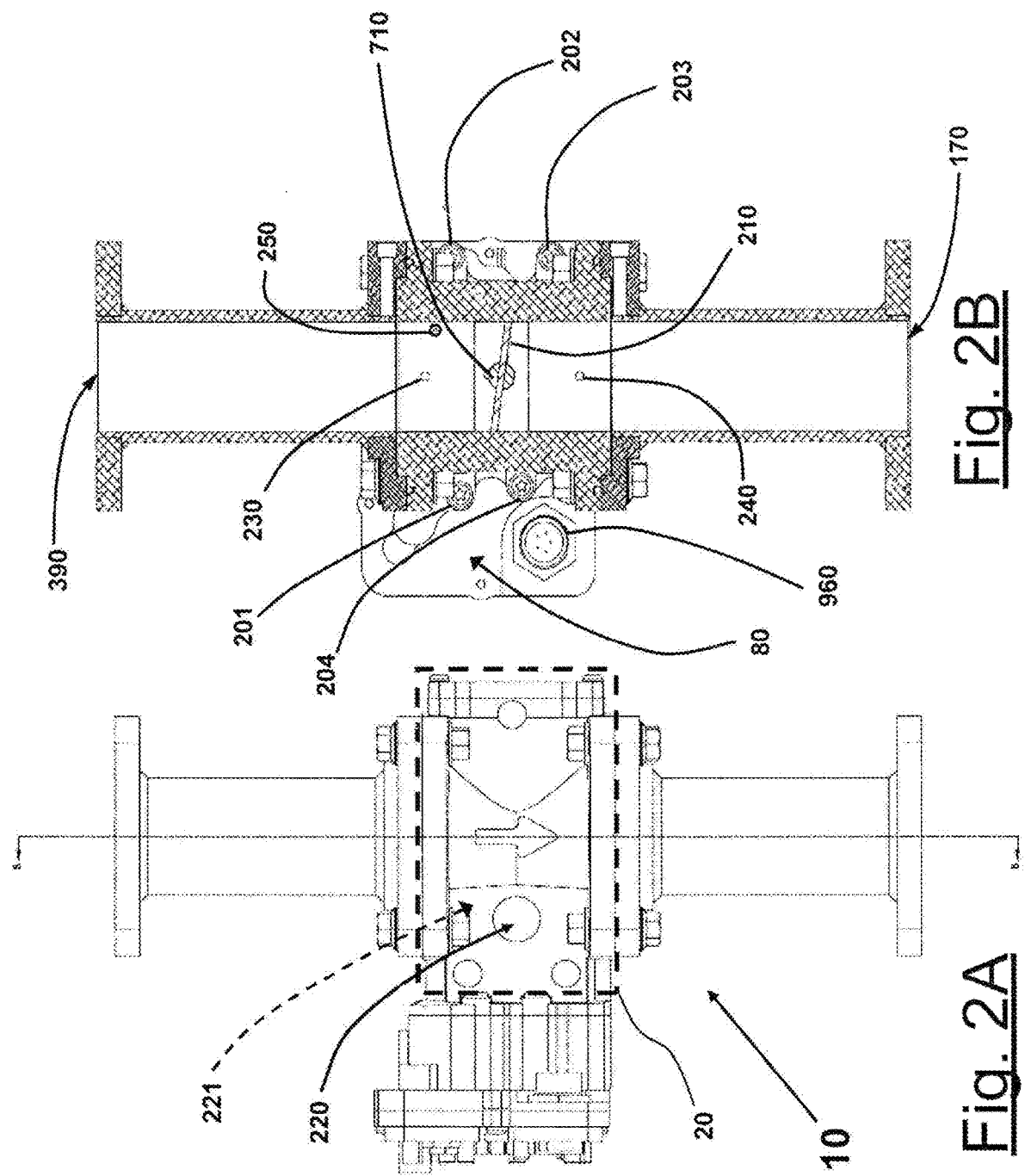

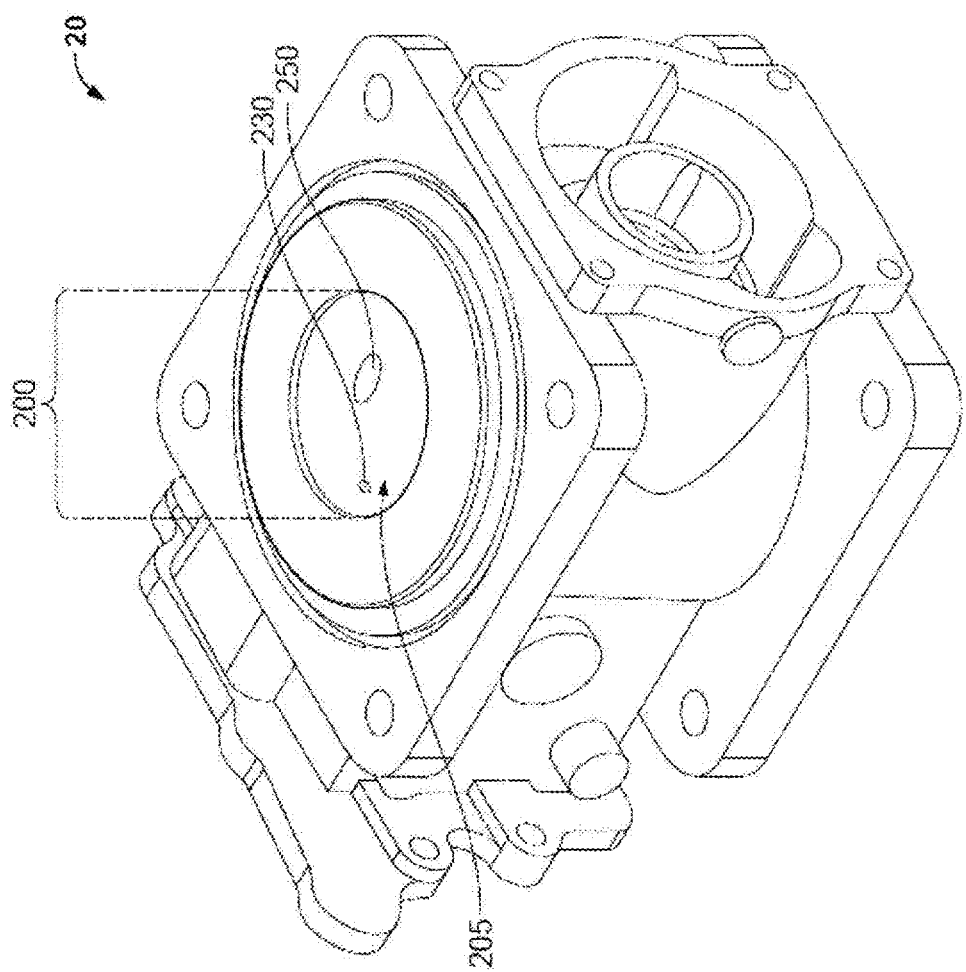

| Closed Loop Error | Estimated BTU | Estimated Methane Number | Spark Advance | Load Limit |
| --- | --- | --- | --- | --- |
| (%) | (BTU/scf) | (MN) | (CA° BTDC) | (%) |
| -45.0 | 2300 | 33 | 9 | 70 |
| -31.0 | 2000 | 38 | 12 | 76 |
| -24.0 | 1870 | 45 | 15 | 81 |
| -17.0 | 1540 | 58 | 19 | 90 |
| -10.0 | 1260 | 75 | 22 | 95 |
| -5.0 | 1120 | 83 | 24 | 100 |
| 0 | 900 | 98 | 25 | 100 |
| 5.0 | 785 | 112 | 25 | 100 |

NATURAL GAS ENGINES WITH FUEL QUALITY DETERMINATION

CROSS-REFERENCE TO RELATED APPLICATIONS

This Application is a Continuation in Part Application of U.S. application Ser. No. 17/905,341 filed on Aug. 31, 2022 and entitled "Natural Gas Engines with Fuel Quality Determination", which is a § 371 National Stage Filing of International Application Serial No. PCT/US21/20557 filed on Mar. 2, 2021 and entitled "Natural Gas Engines with Fuel Quality Determination", which claims the benefit of the filing date of U.S. Provisional Application Ser. No. 62/983,840 filed on Mar. 2, 2020 and entitled "Natural Gas Engines with Fuel Quality Determination". This application hereby incorporates the entire disclosure of U.S. application Ser. No. 17/905,341, International Application PCT/US21/20557, and U.S. Provisional Application 62/983,840 by reference into the present disclosure.

FIELD OF THE INVENTION

The present invention primarily relates to throttles for natural gas engines, particularly for large natural gas engines used in the oil and gas industry. More particularly, it pertains to systems and methods that use throttles and engine control systems for controlling the mass flow rates to the combustion chambers of large gaseous fuel spark-ignited internal combustion engines, particularly for stationary applications in the oil and gas industry.

BACKGROUND

Throttle valves have long been used in natural gas engines in the oil and gas industry, where the natural gas fuel is typically of less predictable quality because the fuel is typically obtained directly or indirectly from a well head. The supply of natural gas fuel fresh from the well head might be piped directly from the well head, or it might pass through filters or dryers first, but the natural gas fuel that is used in the field of the invention is typically otherwise unrefined.

Despite the variable quality of the fuel, accurate flow control is needed in order to ensure that the natural gas engine achieves optimally efficient combustion based on the demands of an Engine Control Module (ECM). Precisely controlled mass flowrates are difficult to achieve, especially with non-choked flow. Electronic throttles are commonly used in large engines to control the mass flow rates of fuel and air. ECM advancements have vastly improved the ability to optimize efficiency and performance and minimize emission concerns with spark-ignited internal combustion engines. By continuously monitoring numerous sensors and inputs, ECM's can balance the current operator commands against performance conditions to determine the most ideal supply flowrates needed for the engine at any given instant.

Achieving such optimal control is all the more challenging when the fuel is unrefined natural gas. Whereas natural gas engines in other fields typically have fuel supplies with known characteristics, the engines in such other fields may be accurately adjusted to achieve maximum power while remaining compliant with emissions standards and other desirable performance characteristics. However, in situations where the quality and/or composition of the fuel is not known or is variable over time, the process for adjusting the engine can be difficult and may often require manual sensing to ultimately provide accurate mass flow of fuel based on the demands of the engine. It is in this context that the disclosed systems and methods can provide much improved automatic adjustments to the engine based on accurately determining the mass flow of air and mass flow of fuel at any given time during operation of the engine.

Thus, there has long been a need for an engine control system with throttles that can not only accurately and consistently deliver ECM-demanded mass flow rates in the field, but that can also provide output to the user about the quality of the natural gas being used as fuel, all the more while controlling non-choked flows, which are common with low-pressure supply flows but which also occur in many high pressure scenarios as well. For more background on the comparisons to choked mass flow control, for which mass flow determinations tend to be more easily achieved, refer to U.S. Pat. No. 9,957,920, a copy of which is incorporated herein by reference in its entirety.

SUMMARY OF THE INVENTION

It will become evident to those skilled in the art that thoughtful use of the invention and embodiments disclosed herein will resolve the above-referenced and many other unmet difficulties, problems, obstacles, limitations, and challenges, particularly when contemplated in light of the further descriptions below considered in the context of a comprehensive understanding of the prior art.

The present invention accomplishes as much by enabling real-time natural gas fuel quality determinations by combining combustion data together with mass flow data relative to the use of fast-acting, highly-accurate gaseous supply throttles for large spark-ignited internal combustion engines, which is particularly beneficial for engines that use unrefined natural gas as a fuel source. Although preferred embodiments typically operate to control non-choked flow, often in low pressure applications, they nonetheless achieve highly accurate mass flow control. Our objectives include enabling such flow control in response to instantaneous demand signals from the engine's ECM while consistently maintaining extreme accuracy over large dynamic power ranges, despite most upstream, downstream and even midstream pressure fluctuations.

Disclosed embodiments include systems and methods of using combinations of throttles, whereby the combination involves a mass-flow-air (MFA) throttle and a mass-flow-gas (MFG) throttle according to the present disclosure, further in combination with an oxygen sensor, wherein the mass flow of air and mass flow of gas are determined. Further, with respect to the configurations of the throttles and other components of the disclosed system, particular properties of the fuel, including British Thermal Unit (BTU) content of the fuel, can be accurately inferred, thereby enabling automatic calibration of the engine and other interventions as desired. This is particularly true in applications where the quality of the fuel is unknown and/or variable over time.

Possible embodiments can manifest in numerous different combinations and in numerous different kinds of improved machines, internal combustion engines, gaseous supply control systems, and the like. Other possible embodiments are manifest in methods for operating and optimizing such machines, engines, systems and the like, as well as in other types of methods. All of the various multifaceted aspects of the invention and all of the various combinations, substitutions and modifications of those aspects might each individually be contemplated as an invention if considered in the right light.

The resulting combinations of the present invention are not only more versatile and reliable, but they are also able to achieve greater accuracy despite rapidly changing conditions over a larger dynamic power range than has ever been achieved with such a simple system. The various embodiments improve on the related art, including by optimizing reliability, manufacturability, cost, efficiency, ease of use, ease of repair, ease of adaptability, and the like. Although the embodiments referenced below do not provide anything remotely near an exhaustive list, this specification describes select embodiments that are thought to achieve many of the basic elements of the invention.

In accord with many of the teachings of the present invention, a throttle is provided in a form that is readily adaptable to the power demands of numerous applications and is readily capable of achieving highly accurate setpoint accuracy for controlling gaseous supply flowrates across very large dynamic power ranges in internal combustion engines. Such flowrate control throttles and related fuel systems materially depart from the conventional concepts and designs of the prior art, and in so doing provide many advantages and novel features which are not anticipated, rendered obvious, suggested, or even implied by any of the prior art, either alone or in any obvious combination thereof.

Through its innovative combination of features and elements, a throttle according to the teachings of the invention is able to consistently and reliably achieve highly accurate mass flow control for various large engine applications, even with non-choked flow. Some of the features and elements that enable that result include the use of a unitary block assembly for the throttle, and a fast-acting actuator, plus a single unitary and rigid rotary shaft for driving a throttle blade, supported by three different bearing assemblies along the length of the shaft, as well as a commonly-contained assembly of the control circuitry together with the rotary actuator as well as the throttle itself, all of which help minimize slop in the control. In addition, the invention is preferably embodied with multiple pressure sensors that are at least partially redundant, which enables the controller to self-check the various sensors in real time.

Particularly advantageous aspects achieved through application of the present invention are systems of throttles with controllers adapted to infer fuel quality properties according to the teachings of the disclosed embodiments, as well as methods of controlling such systems. Such systems and methods preferably use combinations of an MFG throttle for controlling the mass flow of fuel together with an MFA throttle, which is configured either for controlling the mass flow of air or the mass flow of the mixture of air and fuel. Such combinations enable controlling the operation of the throttles so that a controller can interpolate, in reverse, what are the characteristics of the flow of fuel that is being controlled by the MFG throttle, thereby further enabling fine-tuning of the throttle and other interventions as desired.

For more insight with regard to such determinations, preferred embodiments deploy throttles with fast acting and accurate controls such that accurately controllable mass flow rates are achievable despite relatively low pressure fuel supplies and subsonic, non-choked throttle flowrates. The needed accuracy is achieved in part through embodiments that use fast-reacting transducers mounted integral with the throttle position control board, in part so that the position of the throttle shaft is rapidly and accurately monitored virtually as fast as it is being controlled. In addition, preferred embodiments also ensure fast and accurate control in part through precise measurement of flow pressures sampled both upstream and downstream of the throttle, preferably through pressure ports spaced less than half of the throttle diameter upstream and downstream from the central axis of the throttle blade, while the upstream and downstream pressure measurements are preferably reinforced by use of a third pressure sensor—a delta-P sensor—as well. The upstream and downstream pressure sensors themselves, and preferably all three of the mentioned pressure sensors, are preferably also mounted on the same throttle position control board. Other aspects of preferred embodiments include highly accurate fuel and air flow devices that are particularly accurate with fuel property input of specific heat ratio of the fluid and the specific gravity of the fluid. Properties above related to air are unlikely to change (and can be monitored with Envirotech sensor or sensor with similar output) except as related to stoichiometric air-fuel ratio, which can be adjusted with use of oxygen sensor, if the air flow throttle (MFA) is positioned after the fuel admission point. For a given calibrated engine, changes in closed-loop correction are related to air flow changes or fuel flow/fuel property changes. Since air flow for a given speed and load condition can now be measured, changes in closed-loop correction can be attributed to fuel property changes.

Further, in installations where engine horsepower consumption is monitored (compressor bhp/generator kW), use of MFG alone can be used to infer fuel property changes (BTU/kW). Software adaptations are also preferably included to auto adjust the engine based on BTU changes. Changes can be made to phi target (pre and or post cat), spark timing, and/or maximum allowable load based on BTU input. Phi is the ratio of the stoichiometric air-fuel ratio over the actual air-fuel ratio for an internal combustion engine. A second check can be used whereby spark timing is adjusted and knock level is measured. This helps correlate the expected relationship between BTU content and methane number. The engine ECM can export the fuel property information to a gas compressor for more accurate prediction of compressor power and compressor (and internal stage) information. The engine ECM can also export the fuel property information to help with monetizing and metering of the fuel delivered through the pipeline.

Another important and advantageous aspect of the disclosed embodiments includes development of an approach for minimizing the damage caused by backfire events in an engine using a throttle according to the teachings in the attached disclosure to take advantage of the presently disclosed throttle embodiments, when a backfire event is detected by a pressure surge in the downstream pressure port—said pressure surge significantly exceeding the level (such as exceeding more than 50%) that would be expected by pressure fluctuations caused by more normal operation of the engine—the microcontroller is programmed to instantaneously open the throttle blade of throttle for at least 150 milliseconds. After that duration of holding open the throttle blade, a microcontroller then returns to normal operation of the throttle. Due to the fast-acting nature of disclosed throttle embodiments, this approach has been found to minimize damage otherwise caused by a backfire event, such as bending or other damage to the throttle blade and/or throttle shaft.

Another aspect of the disclosed embodiments is the use of a combination of an MFA throttle and MFG throttle that can vastly shorten the development cycle of engines using such throttles.

To be all encompassing, many other aspects, objects, features and advantages of the present invention will be evident to those of skill in the art from a thoughtful and comprehensive review of the following descriptions and accompanying drawings in light of the prior art, all to the extent patentable. It is therefore intended that such aspects, objects, features, and advantages are also within the scope and spirit of the present invention. It should be understood, however, that the detailed description and the specific examples, while indicating preferred embodiments of the invention, are given by way of illustration only, since various expansions, changes and modifications within the spirit and scope of the invention will become apparent to those skilled in the art from this detailed description.

Indeed, the present invention will ultimately be defined relative to one or more patent claims or groups of claims that may be appended to this specification or to specifications that claim priority to this specification, as those claims may be amended, divided, refined, revamped, replaced, supplemented or the like over time. Even though the corresponding scope of the invention depends on those claims, these descriptions will occasionally make references to the "invention" or the "present invention" as a matter of convenience, as though that particular scope is already fully understood at the time of this writing. Indeed, multiple independent and distinct inventions may properly be claimed based on this specification, such that reference to the "invention" is a floating reference to whatever is defined by the ultimate form of the corresponding patent claims. Accordingly, to the extent these descriptions refer to aspects of the invention that are not separately required by the ultimate patent claims, such references should not be viewed as limiting or as describing that variation of the invention.

The invention, accordingly, is not limited in its application to the details of construction and to the arrangements of the components set forth in the following descriptions or illustrated in the drawings. Instead, the drawings are illustrative only, and changes may be made in any specifics illustrated or described, especially any referenced as "preferred." Such changes can be implemented while still being within the spirit of the invention. Also, it is to be understood that the phraseology and terminology employed herein are for the purpose of the description and should not be regarded as limiting. Other terminology and language that describes the invention and embodiments and their function will be considered as within the spirit of the invention.

The invention is capable of many other embodiments and of being practiced and carried out in numerous other ways. It should also be understood that many other alternative embodiments are not shown or referenced that would still be encompassed within the spirit of the invention, which will be limited only by the scope of claims that may be original, added, or amended in this or any other patent application that may in the future claim priority to this application.

BRIEF DESCRIPTIONS OF THE DRAWINGS

Various features and advantages of the invention will now be described with reference to the drawings of certain preferred and alternative embodiments, which are intended to illustrate and not to limit the invention, where reference numbers may refer to like elements.

FIG. 2A is a front view of the preferred large engine throttle 10.

FIG. 2B is a sectional view of the preferred large engine throttle 10 of FIG. 2A, centrally sectioned through sectional plane B-B of FIG. 2A.

FIG. 4 is a perspective view of the throttle body assembly 20.

Figure 10:
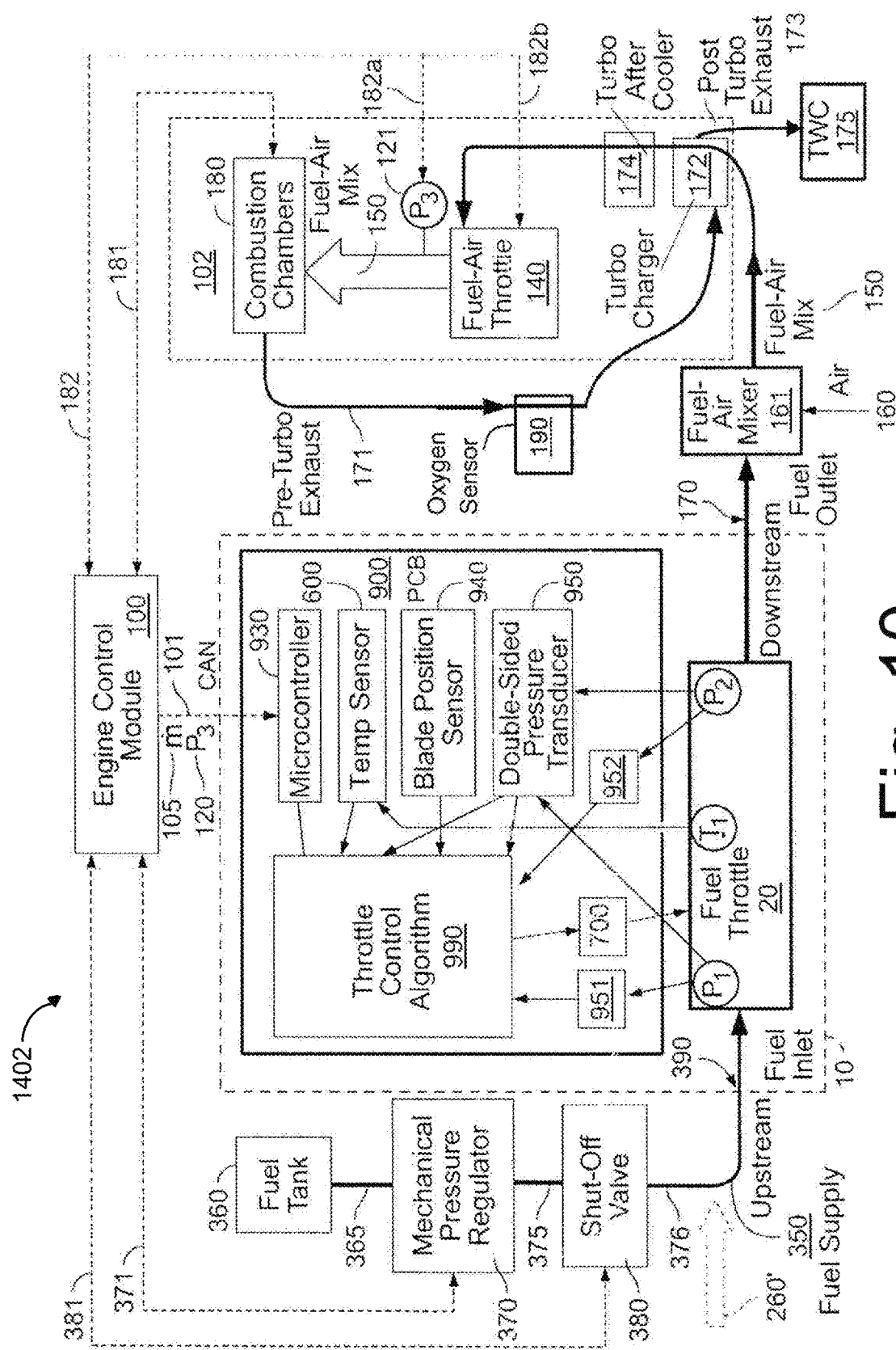

FIG. 10 is a block diagram illustrating a preferred embodiment of a gaseous fuel supply system with a large engine MFG throttle 10, operatively integrated with an internal combustion engine 102 to provide highly accurate control of the gaseous fuel supply to that engine 102 in accordance with various teachings of the present invention.

Figure 11A:
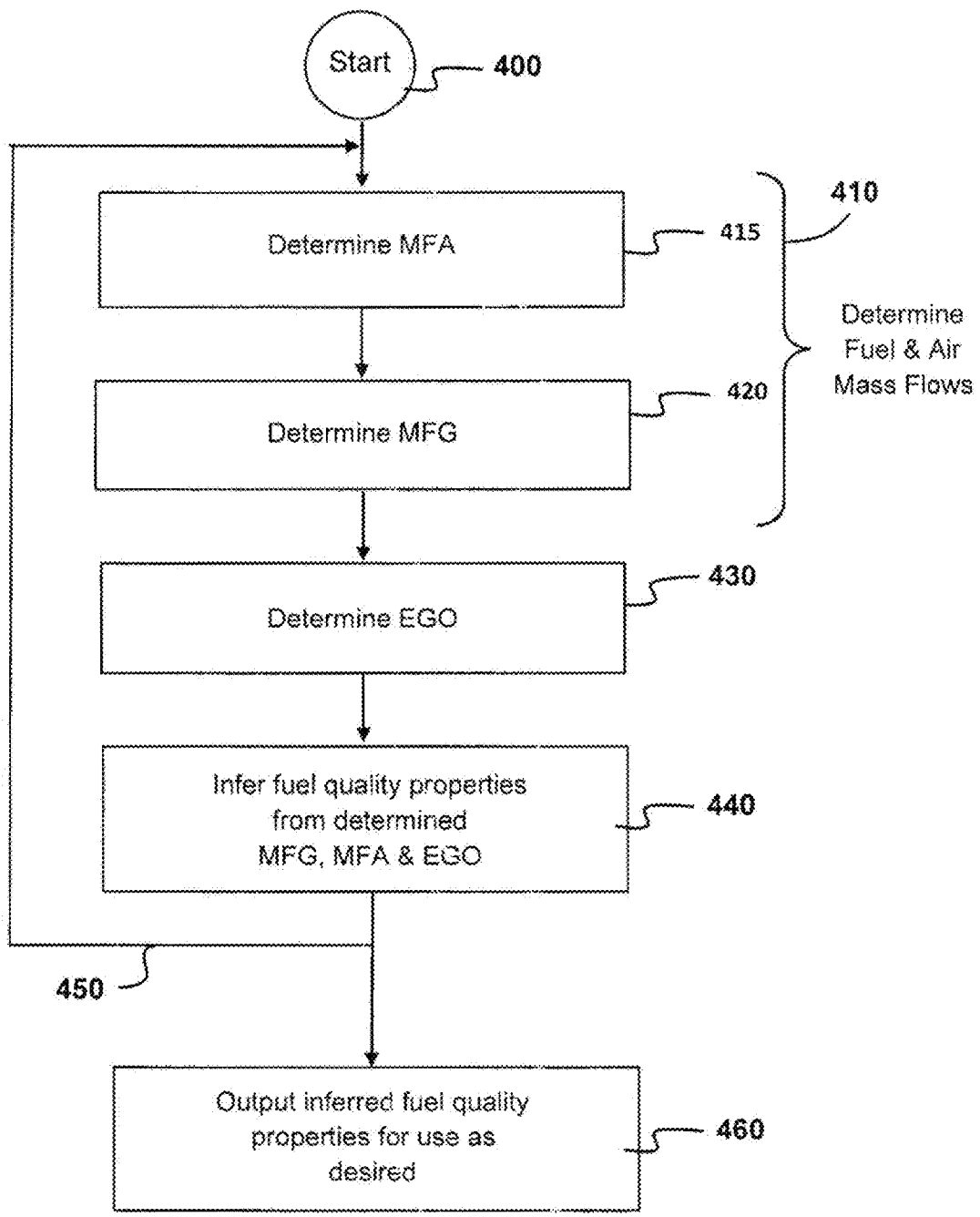

FIG. 11A provides a flowchart that is representative of methods of using fuel-air mass flow characteristics such as may be achieved with a system that uses two throttles according to teachings of the present invention, such as both a fuel throttle 20 and a fuel air throttle 140 as shown in FIG. 10, as well as combustion results such as information from an exhaust gas oxygen sensor 190, to make inferences about the quality of the fuel being combusted.

Figure 11B:
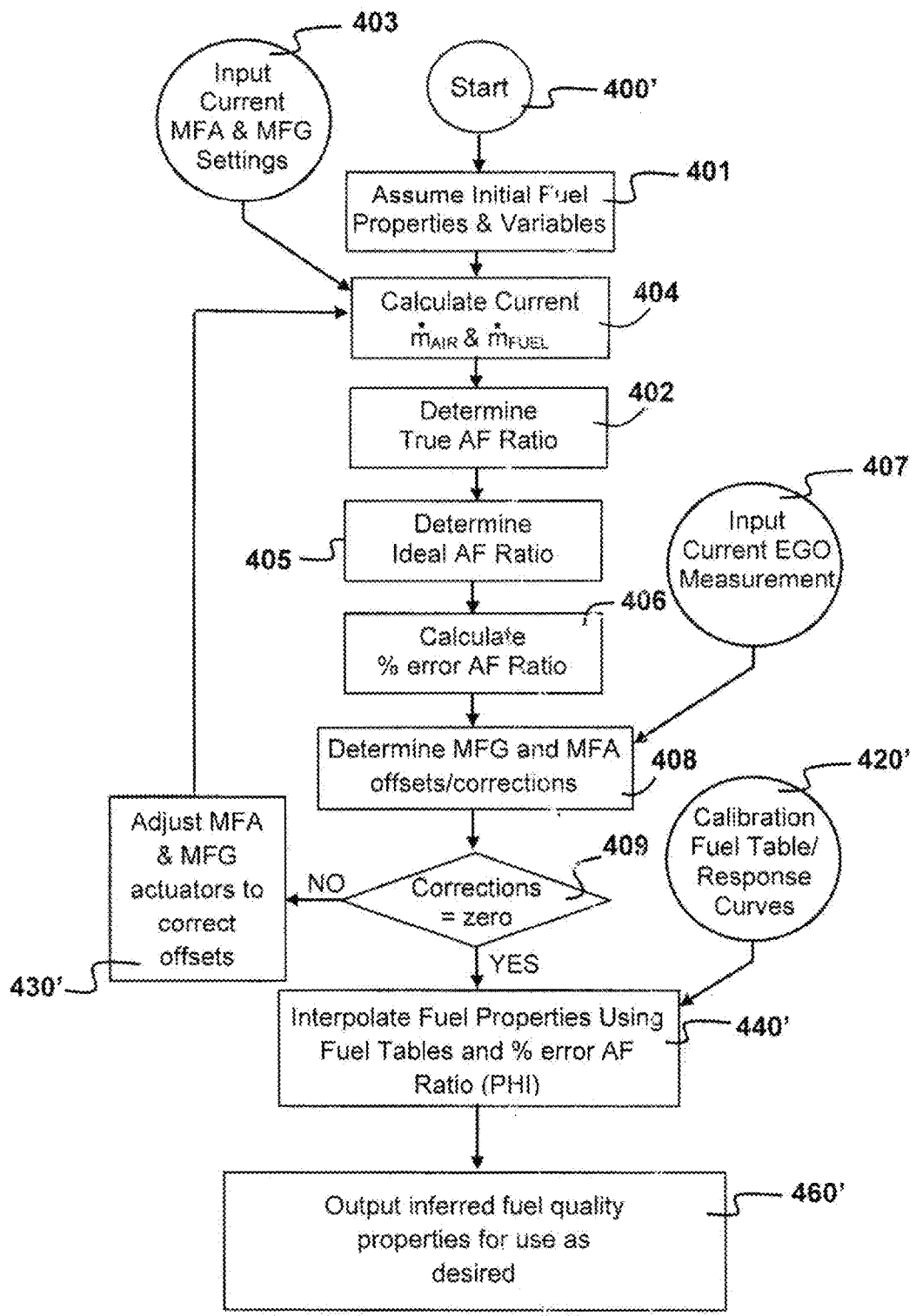

FIG. 11B provides a flowchart that is representative of methods of using air-fuel ratio characteristics such as may be achieved with a system that uses two throttles according to teachings of the present disclosure. FIG. 11B is intended to provide further insight into the methods described in FIG. 11A.

Figure 11C:
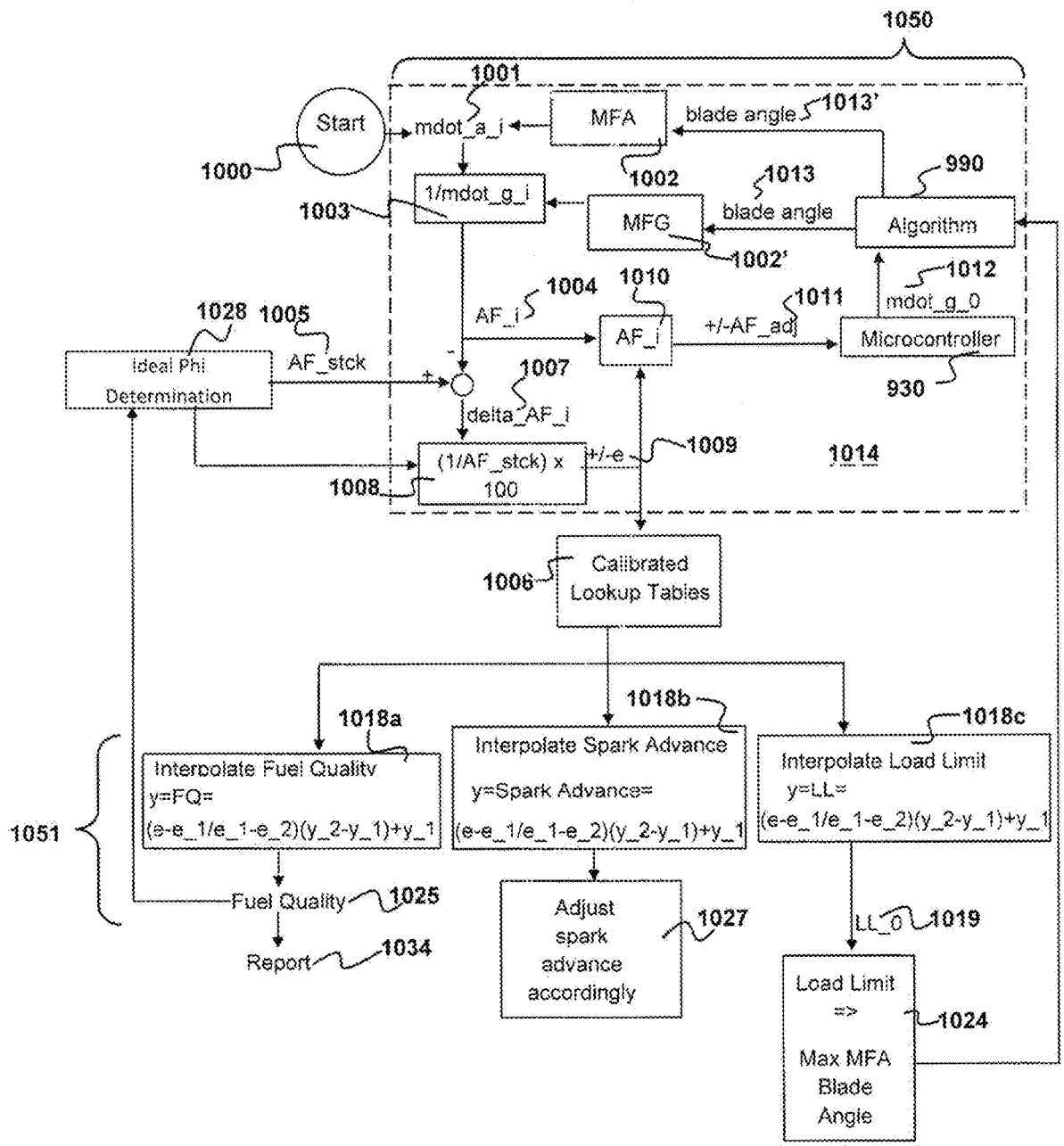

FIG. 11C provides a block diagram intended to further represent the methods described in FIG. 11A and FIG. 11B. FIG. 11C emphasizes the methods for determining select fuel properties and the control strategies for adjusting fuel properties.

Figures 12, 13:
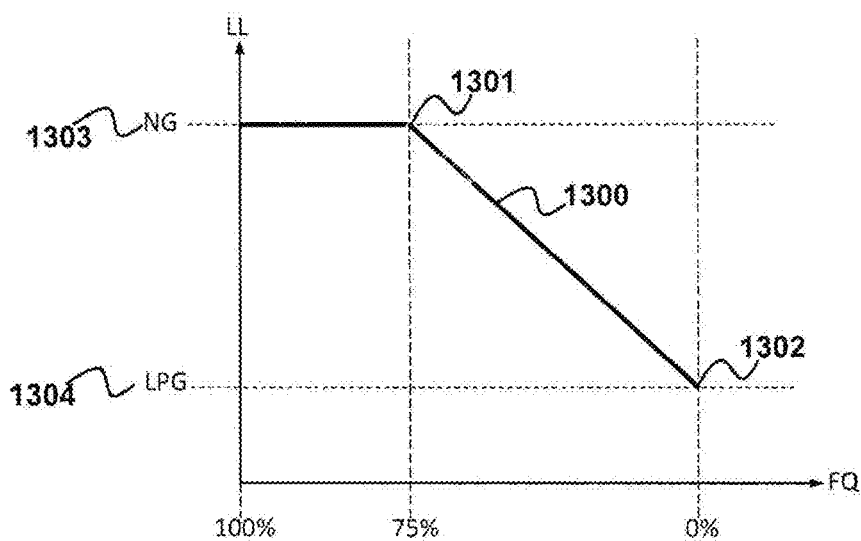

FIG. 12 provides a representative fuel table used to infer select fuel properties.

FIG. 13 provides a representative response curve that serves as a supplementary source for inferring select fuel properties.

Figure 14:
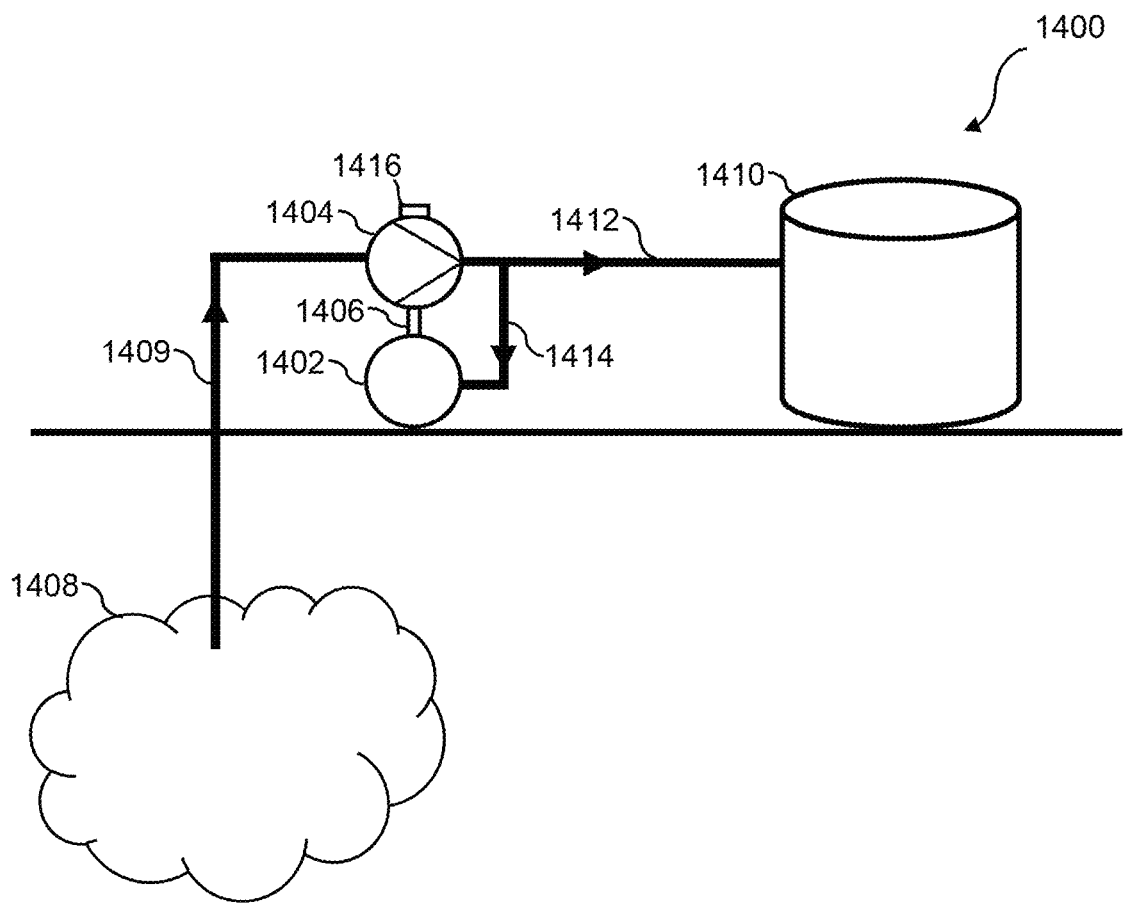

FIG. 14 illustrates a fuel recovery system incorporating a power system of this disclosure.

Figure 15A:
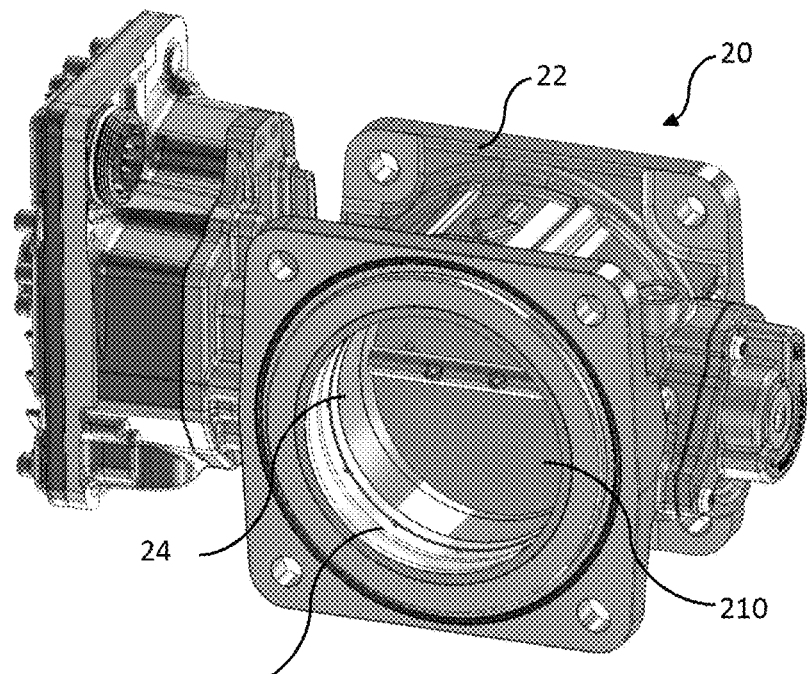
Figure 15B:
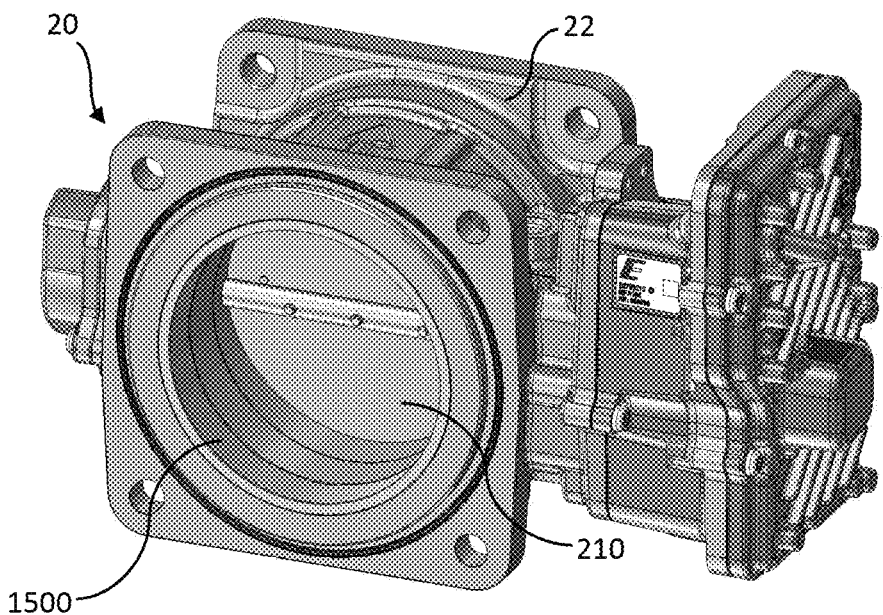

FIGS. 15A and 15B illustrate perspective downstream and upstream views, respectively, of a throttle valve body assembly including bore annular sensing rings, according to an embodiment of this disclosure.

Figure 16A:
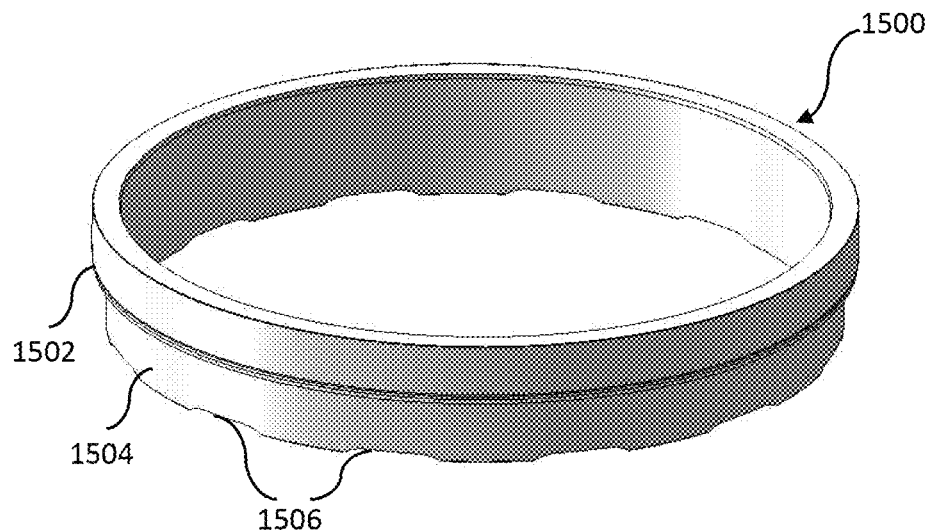
Figure 16B:
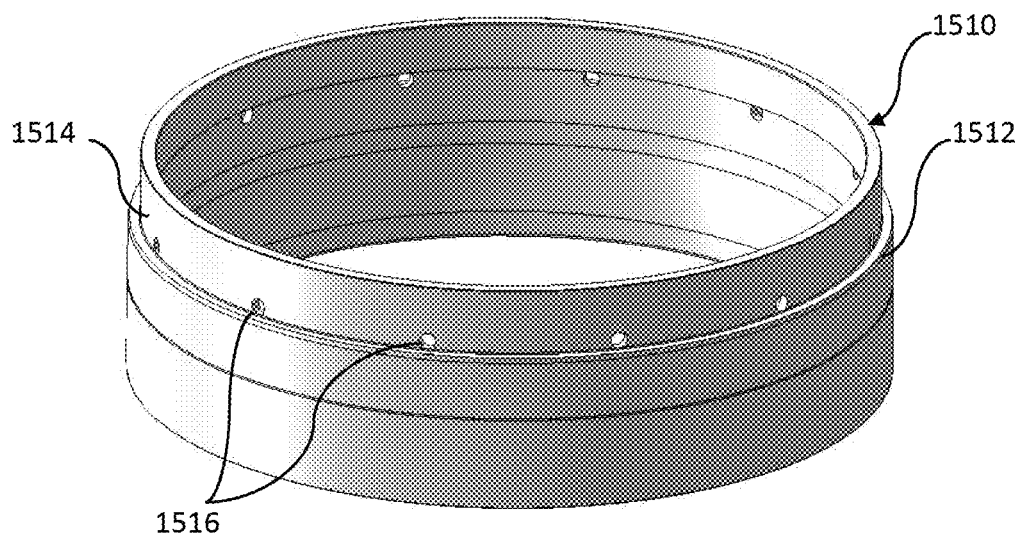

FIGS. 16A and 16B illustrate the upstream and downstream sensing rings, respectively, illustrated in FIGS. 15A and 15B.

Figure 17:
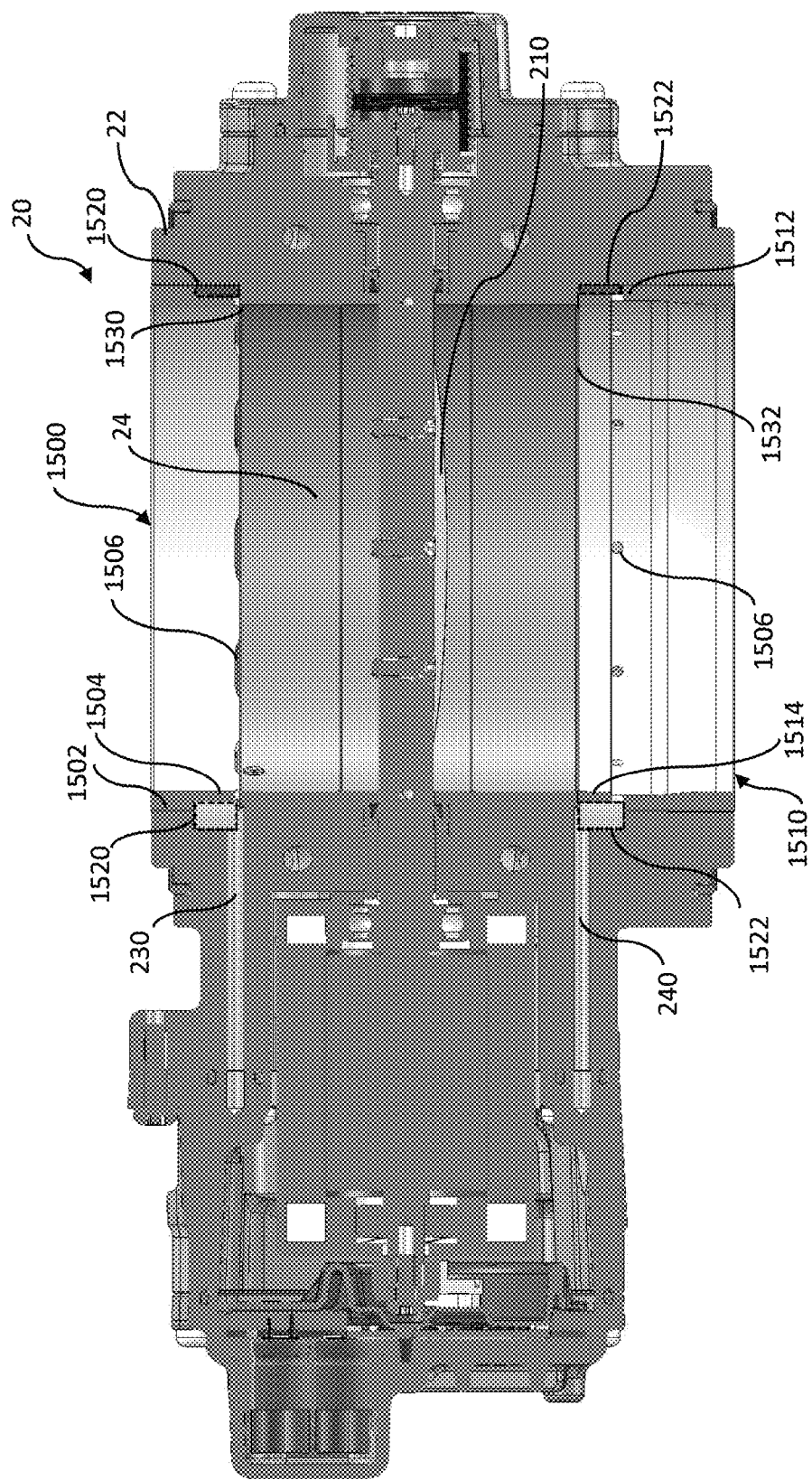

FIG. 17 illustrates a cross-sectional view of the throttle valve body assembly illustrated in FIGS. 15A and 15B.

DETAILED DESCRIPTIONS OF ILLUSTRATED EMBODIMENTS

The following examples are described to illustrate preferred embodiments for carrying out the invention in practice, as well as certain preferred alternative embodiments to the extent they seem particularly illuminating at the time of this writing. In the course of understanding these various descriptions of preferred and alternative embodiments, those of skill in the art will be able to gain a greater understanding of not only the invention but also some of the various ways to make and use the invention and embodiments thereof.

Wording Conventions

For purposes of these descriptions, a few wording simplifications should be understood as universal, except to the extent otherwise clarified in a particular context either in the specification or in any claims. For purposes of understanding descriptions that may be basic to the invention, the use of the term "or" should be presumed to mean "and/or" unless explicitly indicated to refer to alternatives only, or unless the alternatives are inherently mutually exclusive. When referencing values, the term "about" may be used to indicate an approximate value, generally one that includes a standard deviation of error for any particular embodiments that are disclosed or that are commonly used for determining or achieving such value. Reference to one element, often introduced with an article like "a" or "an", may mean one or more, unless clearly indicated otherwise. Such "one or more" meanings are most especially intended when references are made in conjunction with open-ended words such as "having," "comprising" or "including." Likewise, "another" may mean at least a second or more. Other words or phrases may have defined meanings either here or in the accompanying background or summary descriptions, and those defined meanings should be presumed to apply unless the context suggests otherwise.

These descriptions occasionally point out and provide perspective as to various possible alternatives to reinforce that the invention is not constrained to any particular embodiments, although described alternatives are still just select examples and are not meant to represent an exhaustive identification of possible alternatives that may be known at the time of this writing. The descriptions may occasionally even rank the level of preference for certain alternatives as "most" or "more" preferred, or the like, although such ranked perspectives should be given little importance unless the invention as ultimately claimed irrefutably requires as much. Indeed, in the context of the overall invention, neither the preferred embodiments nor any of the referenced alternatives should be viewed as limiting unless our ultimate patent claims irrefutably require corresponding limits without any possibility for further equivalents, recognizing that many of the particular elements of those ultimate patent claims may not be required for infringement under the U.S. Doctrine of Equivalents or other comparable legal principles. Having said that, even though the invention should be presumed to cover all possible equivalents to the claimed subject matter, it should nonetheless also be recognized that one or more particular claims may not cover all described alternatives, as would be indicated either by express disclaimer during prosecution or by limits required in order to preserve validity of the particular claims in light of the prior art.

As of the date of writing, the structural and functional combinations characterized by these examples are thought to represent valid preferred modes of practicing the invention. However, in light of the present disclosure, those of skill in the art should be able to fill-in, correct or otherwise understand any gaps, misstatements or simplifications in these descriptions.

For descriptive reference, we categorize supply flowrate setpoint accuracy as being "generally accurate" if it is consistently within 5% of the demanded flowrate across its entire operating range. When consistently within 3% of the demanded flowrate across the entire range, setpoint accuracy can be categorized as "highly accurate." At the extreme, when setpoint accuracy is consistently within about 1% of the demanded flowrate across the entire operating range, it can be classified as "extremely accurate."

It is also notable that, while many embodiments may be used for mass flow control of either air or fuel, or combinations of air and fuel, these descriptions will commonly refer to control of a "supply flow", which should generally be understood to refer to control of any such supply flow, whether it be air, fuel, or a combination. It will be understood, nonetheless, that a throttle according to these descriptions that is intended strictly for controlling the fuel supply flow will be plumbed at a different location than one that is plumbed for just controlling air. Likewise, a throttle according to these descriptions that is deployed for controlling mass flow of air without fuel will be plumbed at a different location than one that is plumbed for controlling the mixture of fuel and air. We presently prefer to include one throttle for controlling just the gaseous fuel supply flow, to achieve highly accurate control of the mass flow of the fuel (sometimes referred to as mass-flow-gas, or "MFG"), together with another throttle further downstream for controlling the supply flow after air has been mixed with the supply flow of fuel (which is sometimes referred to as mass-flow-air, or "MFA", irrespective of the inclusion of the fuel in the same flow). Nonetheless, complete and highly accurate mass flow control can also be achieved by combining an MFG throttle together with an MFA throttle that is plumbed in the air supply upstream of the fuel-air mixer. Moreover, generally accurate overall control might also be attainable by just controlling the mass flow of the fuel, without actively controlling the mass flow of the air if other reliable data is used to calculate that mass flow of the air, such as through use of oxygen sensors in combination with pressure, temperature and the like.

With respect to any valve, throttle or actuator, "fast-acting" is a term that is generally understood by those of skill in the art, and the term should be presumed to generally mean that it is designed to act or respond considerably faster or quicker than most throttles, valves or actuators. More limited definition may be applied to the phrase to the extent expressly disclaimed during prosecution or to the extent necessary for preserving validity of particular claims in light of the prior art. Despite the presumed broader meaning, fast-acting actuators referenced in these descriptions are preferably operable to move the actuated throttle element through most of its entire operable range of motion (preferably from 20% to 80% of that operable range), if not all of that operable range, in fifty milliseconds or less, although many other types of actuators are still likely to be suitable as alternatives, especially to the extent particular claim elements are not expressly disclaimed to require particular fast-acting characteristics.

The term "large engine throttle" 10 is used herein to describe the mass-flow throttle of numerous preferred embodiments and it refers to the throttle and throttle control system rather than merely the throttle body assembly 20 or the butterfly valve (or throttle blade) 210 therein. Despite the "large engine" descriptor for throttle 10, the reader should understand that various aspects of such large engine throttle may be beneficial for smaller engines as well, such that the reference to "large engine" should not be considered as limiting unless estoppel, validity in view of the prior art, or other legal principles clearly require an interpretation that is limited to large engines. The simpler term "throttle" 20 is used herein interchangeably with the term "throttle body assembly" 20. With respect to fuels, the term "fluid" is used herein to mean either a liquid or a gas, although liquid fuel embodiments are preferably adapted to vaporize the liquid phase of the fuel before the flow reaches the large engine throttle 10. In the context of a supply flowrate control, a "continuous fluid passage" refers to a fluid passageway of any sort, whether defined through tubes, channels, chambers, baffles, manifolds or any other fluid passageway that is uninterrupted by fully closed valves, pistons, positive displacement pumps or the like during its normal operative mode of controlling the fuel flowrate, such that gaseous fluid is generally able to continually flow through a continuous fluid passage whenever a pressure gradient is present to cause such flow. It should be recognized, though, that a continuous fluid passage in this context can be regulated to zero flowrate by reducing the effective area of an opening to zero, while the passage would still be considered as a continuous fluid passage in this context. In addition, absent clear disclaimer otherwise, equivalent structures can be fully closed when not operating to control the flowrate, and equivalent structures may also have parallel or alternate passageways where one or more may be interrupted without discontinuing the overall flow.

Exploded and Unexploded Views of Large Engine Throttle 10

Figure 1A:
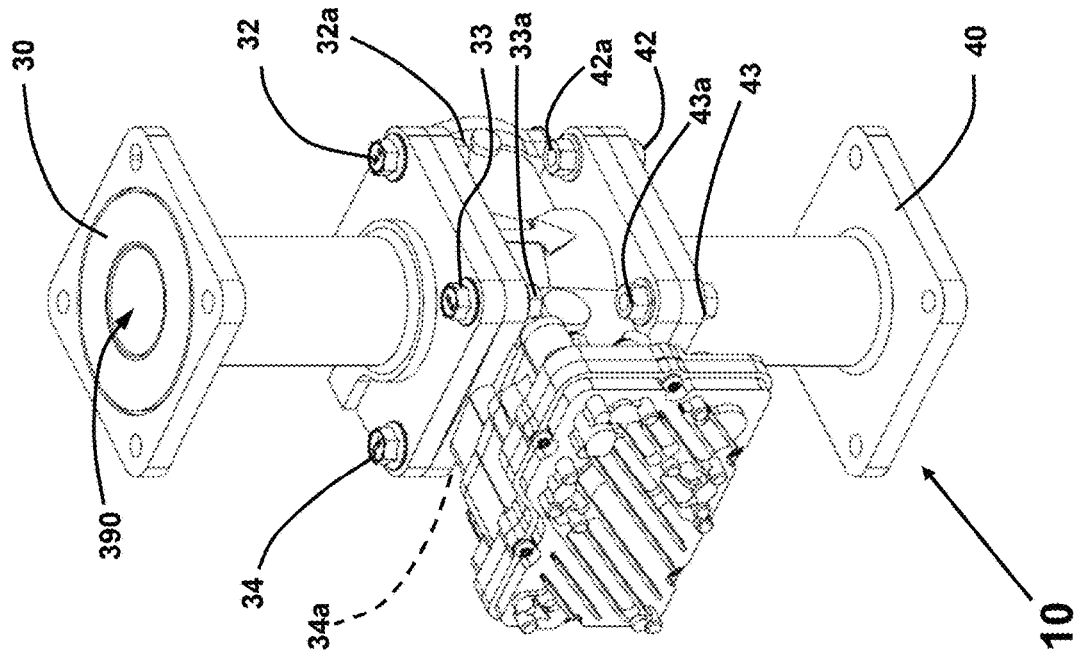
FIG. 1A and FIG. 1B are perspective views of the preferred mass flow throttle 10.
Figure 1B:
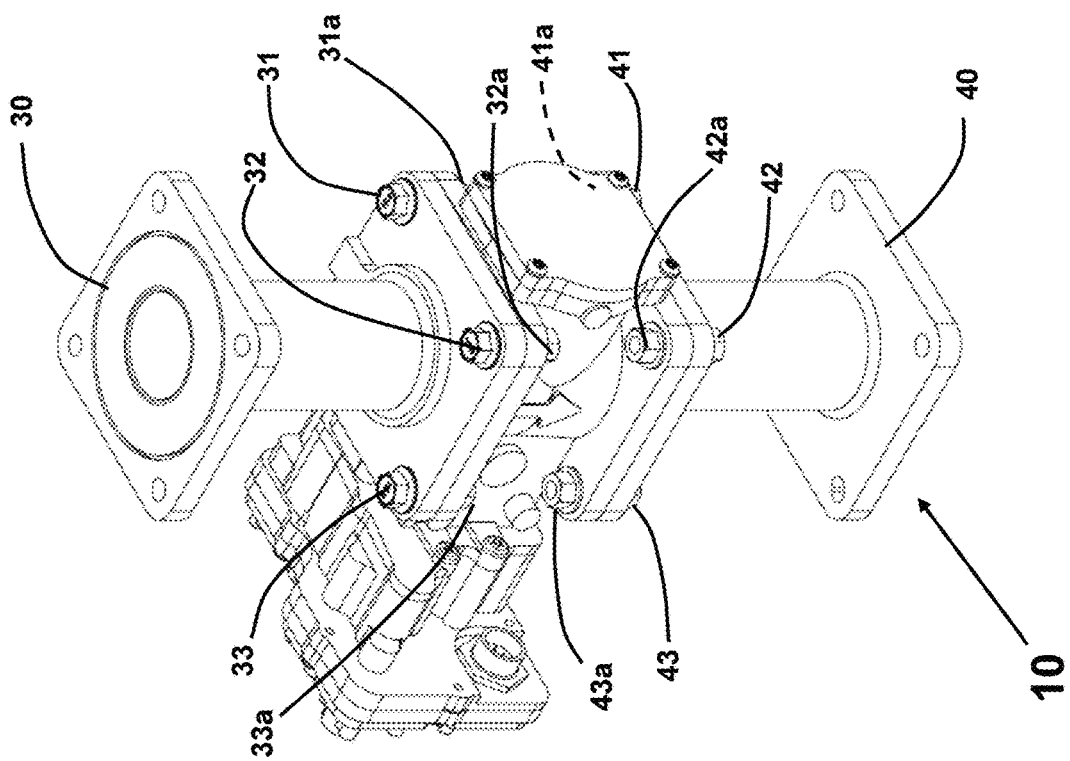

Turning to FIGS. 1A and 1B, there are shown perspective views of the preferred large engine throttle 10. As shown therein, large engine throttle 10 includes an inlet adapter 30 and an outlet adapter 40. Inlet adapter 30, in part, defines supply inlet 390, which is configured to allow supply flow into large engine throttle 10. Outlet adapter 40, in part, defines supply outlet 170 (shown in FIGS. 2B and 10), which is configured to allow supply flow out of large engine throttle 10. Machine screws 31-34 are paired with machine nuts 31a-34a for securing inlet adapter 30 to housing assembly 20 (shown in more detail in FIGS. 2A-4). Similarly, machine screws 41-44 are paired with machine nuts 41a-44a for securing outlet adapter 40 to housing assembly 20. Detailed descriptions of assemblies and components of the preferred embodiment are provided in ensuing paragraphs.

With reference to FIG. 2A, there is shown a two-dimensional view of the large engine throttle 10. A coolant port 220 can be seen in the front of housing assembly 20 (shown in dashed-line box) and another coolant port 221 (not shown) is located on the opposite side. Especially when throttle 10 is used as an air-fuel (MFA) throttle, hot gasses may flow through throttle 10. To cope with the temperature of such hot gasses, and particularly to guard against thermal damage to the control circuitry associated with PCB 900 or to the motor 700, a heat dissipator (not numbered) is located within the unitary block assembly 99 between main throttle body assembly 20 and motor 700 as well as PCB 900. The heat dissipater preferably is in the form of an aluminum component enclosing one or more flow-through passageways with relatively large surface areas for enabling liquid coolant to circulate therethrough and thereby cool the aluminum component. As will be understood by those of skill in the art, heat dissipators are commonly used on turbocharged applications like the large engine throttle 10. The coolant ports 220 and 221 enable coolant to enter and flow around the large engine throttle 10 to keep the brushless motor 700 (shown in FIG. 7) and main PCB 900 (shown in FIG. 9) from overheating.

With reference to FIG. 2B, there is shown a cross-section, indicated by line B-B, of the embodiment illustrated in FIG. 2A rotated clockwise 90 degrees. The throttle shaft 710 (sometimes referred to as an actuator "drive shaft") controls movement of the throttle blade 210, with minimal opportunity for slop or other errors. The upstream pressure $P_1$ (upstream of throttle blade 210) is measured at port 230 by pressure sensor 951 on PCB 900, as the stovepipe of sensor 951 is connected in open fluid communication with port 230, through an open passage (not shown) that runs through the unitary block assembly and a tube between port 230 and the stovepipe of sensor 951. Likewise, the downstream pressure $P_2$ (downstream of throttle blade 210) is measured at port 240 by pressure sensor 952 on PCB 900, as the stovepipe of sensor 952 is connected in open fluid communication with port 240, through an open passage (not shown) that runs through the unitary block assembly and a tube between port 240 and the stovepipe of sensor 952.

Each of ports 230 and 240 have fluid passage segments in close proximity to the ports that are oriented perpendicular to the flowline of the throttle fluid passage of throttle 10, to minimize stagnation or suction pressures due to their orientation relative to flow. However, the next adjacent segments of each are oriented to slope slightly upwardly relative to gravity in order to minimize the risk of clogging. The temperature of the fluid is measured at port 250 using a thermistor 600 (shown in FIG. 6). Machine screws 201-204 unite throttle body assembly 20 with intermediate housing assembly 80.

Figure 3:
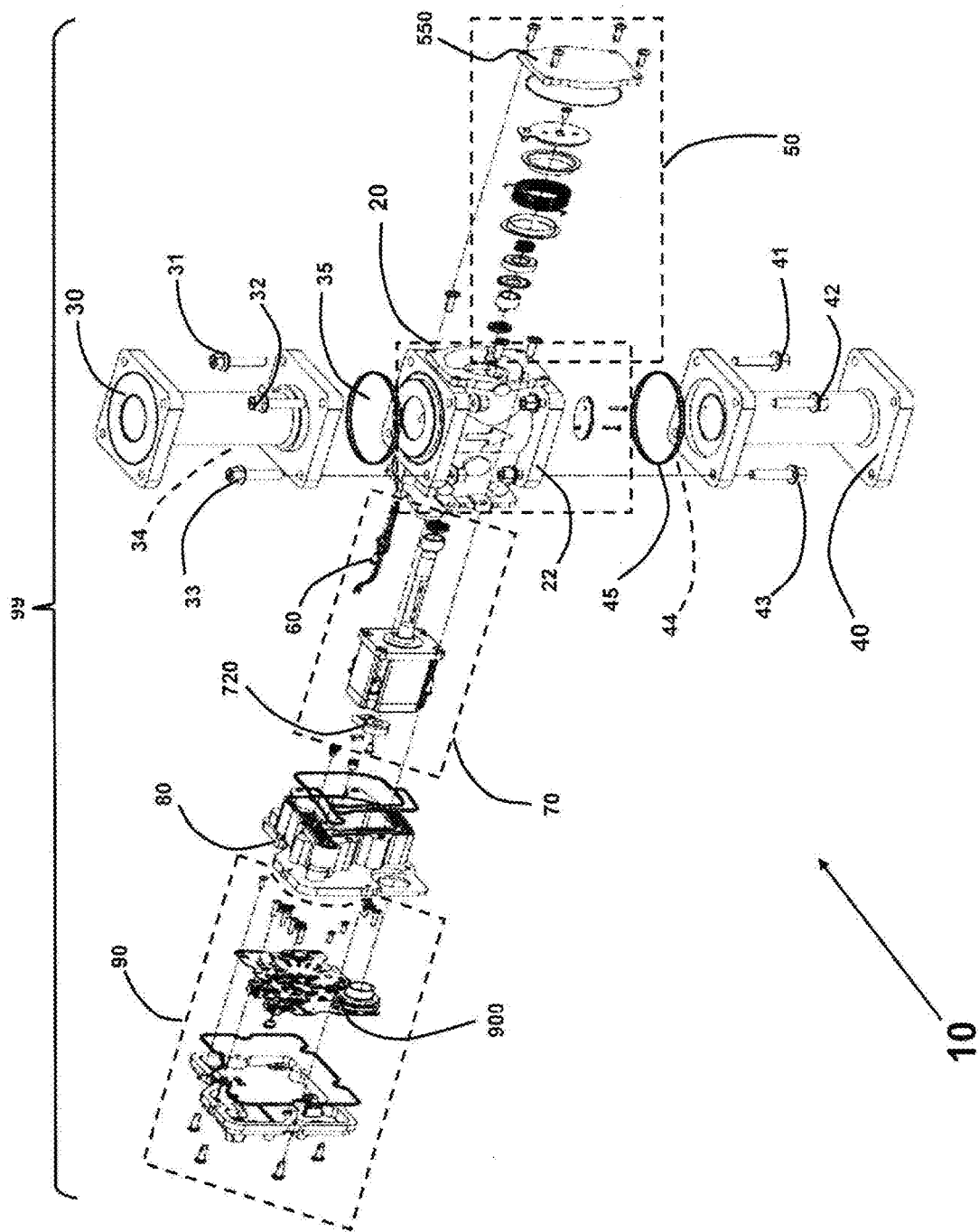
FIG. 3 is an exploded perspective view of the preferred large engine throttle 10.
Figure 3A:
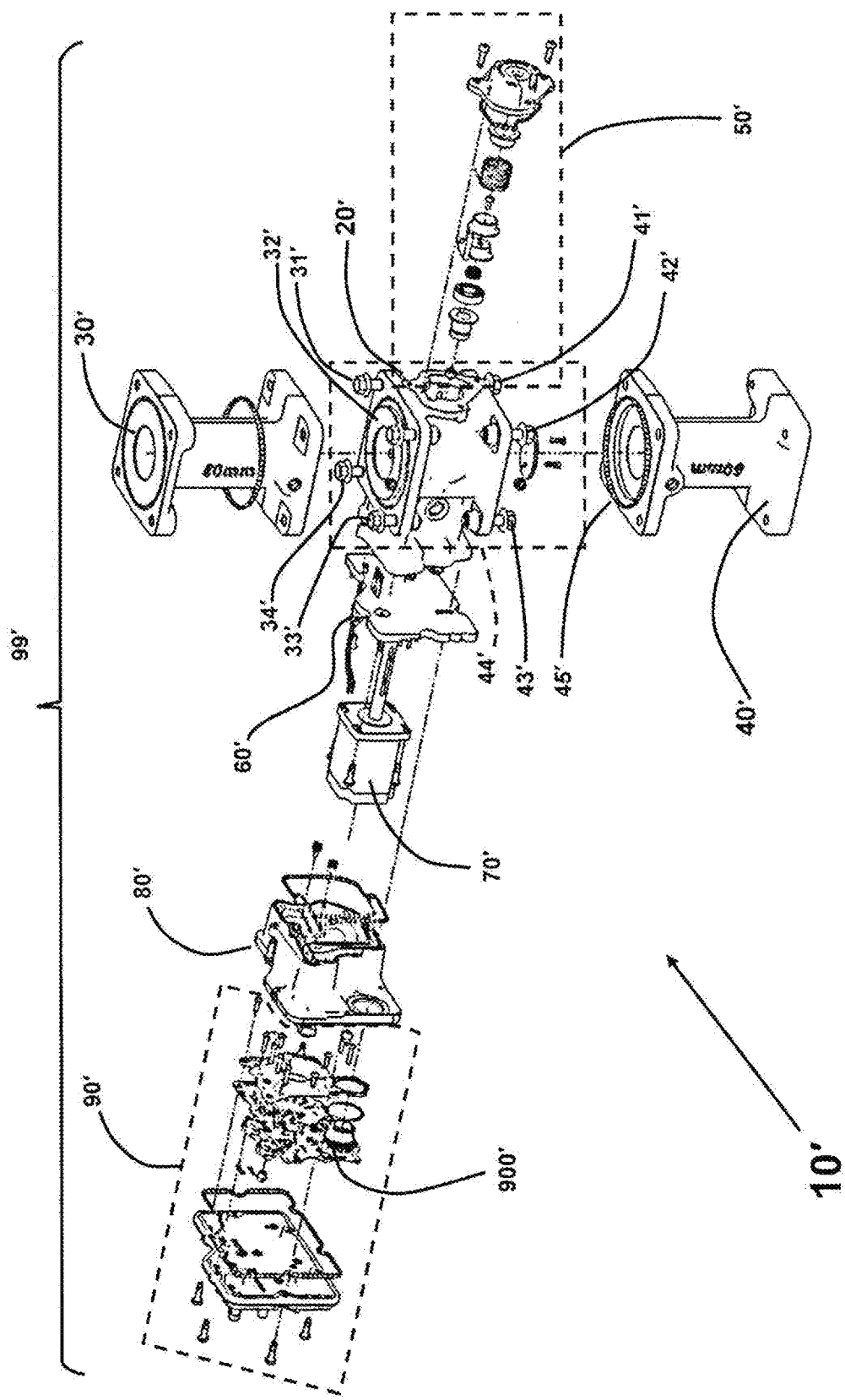
FIG. 3A is an exploded perspective view of large engine throttle 10', which is an alternative embodiment of the throttle 10 of FIG. 3.

With reference to FIG. 3, dashed-line boxes are used to depict some of various assemblies of and within an embodiment of the unitary block assembly 99 of throttle 10. While some (but not all) embodiments of the throttle 10 employ a unitary block for each throttle 10, assemblies that rigidly unite to form the unitary block assembly 99 include the throttle body 22 of central throttle body assembly 20, the spring return cover 550 of spring return assembly 50 at the end toward the right in FIG. 3, control circuitry cover 901 at the other end toward the left in FIG. 3, with the intermediate housing 800 of motor enclosure 80 positioned between throttle body assembly 20 and the PCB space. In addition, as will be understood, numerous screws are used to rigidly unite the sub-blocks of the embodiment of FIG. 3 together, preferably with inset seals to ensure a sealed union between each of the various subblocks. Two additional subblocks—namely the inlet extension and the flow outlet extension are also united to the unitary block assembly 99 of FIG. 3. Analogously, the unitary block assembly 99' of the embodiment shown if FIG. 3A is also very similar to assembly 99 of FIG. 3.

More particularly, the unitary block assembly is composed of various sub-blocks and covers that are preferably all of predominantly aluminum composition in the preferred embodiment. The resulting unitary block assembly of throttle 10 defines the inner and outer surfaces of throttle 10. That unitary block assembly is illustrated as a billet type assembly of aluminum parts evident in the various views of FIGS. 1-4, although it should be understood that preferred embodiments may also be formed through larger castings having fewer sub-blocks in order to reduce costs for volume production. These assemblies are illustrated in greater detail in the figures that follow. In FIG. 3 there is shown an inlet adapter 30 above a throttle body assembly 20 (more particularly shown in FIG. 4). Four screws 31-34 (three shown) unite the inlet adapter 30 to the throttle body assembly 20 with a circular seal 35, to sealingly enable mass flow from upstream into the throttle body assembly 20. Similarly, the outlet adapter 40 is united with throttle body assembly 20 using screws 41-44 with a circular seal 45, to sealingly enable mass flow downstream from the throttle body assembly 20. Although of secondary importance, it may be noted that the inlet adapter 30 and outlet adapter 40 are more beneficial when throttle 10 is being used as an MFG throttle, as opposed to when it is being used as an MFA throttle.

Although each of the plurality of spaces defined by the unitary block assembly and that collectively contain the rotary shaft 710—namely the PCB space, the motor space of intermediate housing 800, the throttle body space, and the spring return assembly space of assembly 50—are formed by sealed uniting of adjacent sub-blocks, leakage may still occur from one such space to the next due to the imperfect seals around a rotating shaft 710. Accordingly, to protect the control circuitry of PCB 900 from the corrosive effects of gaseous fuel supplies, electronic components of PCB 900 are coated with a coating that is protective of such electronic components against the otherwise corrosive characteristics of gaseous fuels.

Figure 5:
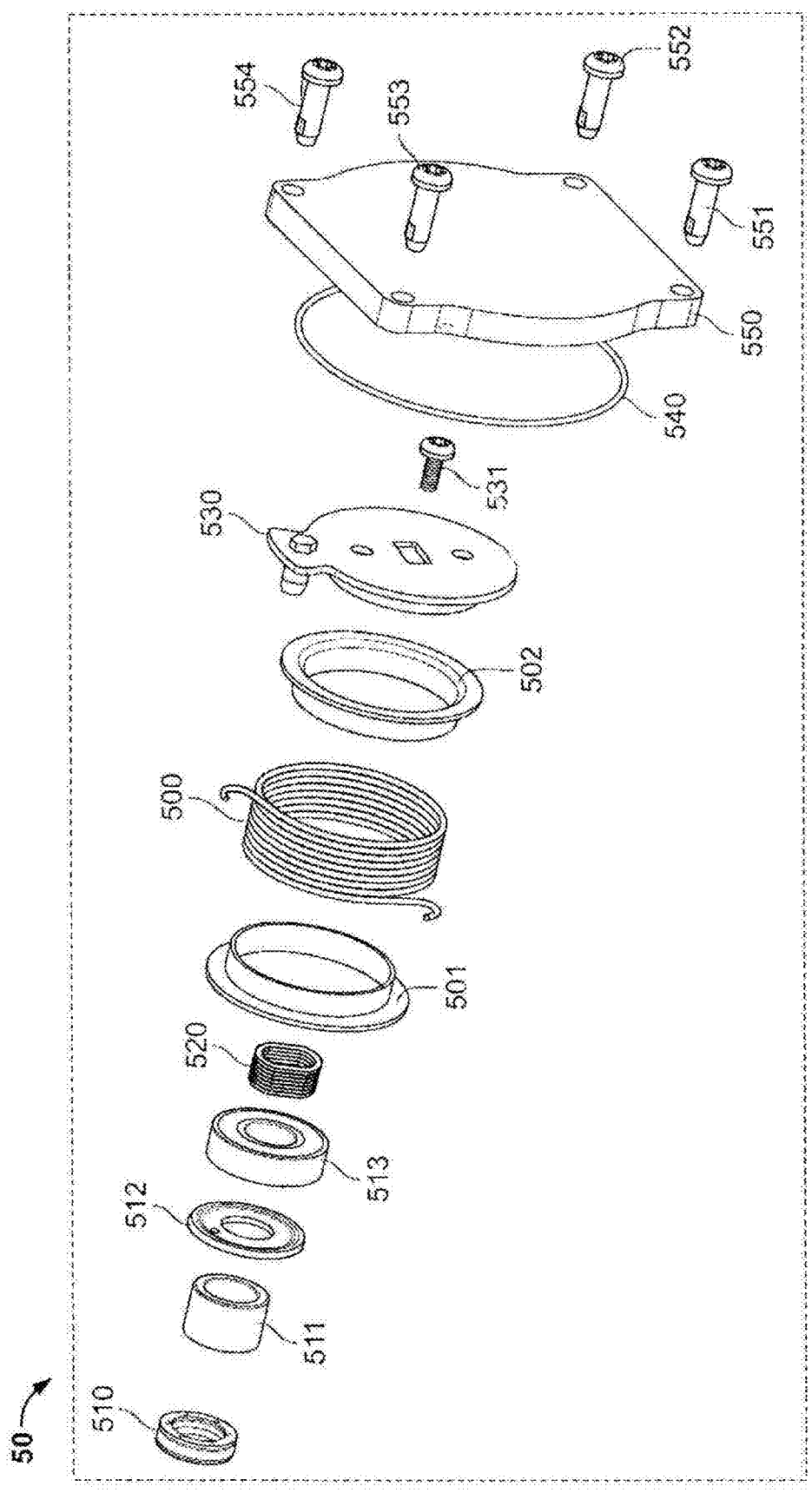
FIG. 5 is an exploded perspective view of spring assembly 50.

To the right of throttle body assembly 20 is a spring assembly 50 (shown in detail in FIG. 5). The spring assembly 50 operates as a torsion type spring that winds up while the block assembly 10 is powered on. When the block assembly 10 is powered off, the spring assembly 50 winds down and returns to a closed position or, more preferably, to a substantially closed position. To the left of throttle body assembly 20 is a thermistor assembly 60 (shown in detail in FIG. 6) that senses temperature. Also to the left of throttle body assembly 20 is a motor and throttle shaft assembly 70 (shown in detail in FIG. 7) that controls the movement of the throttle (shown in FIG. 4). An intermediate housing assembly 80 (shown in detail in FIG. 8) unites the motor and throttle shaft assembly 70 and a printed circuit board (PCB) assembly 90 (shown in detail in FIG. 9).

Figure 5A:
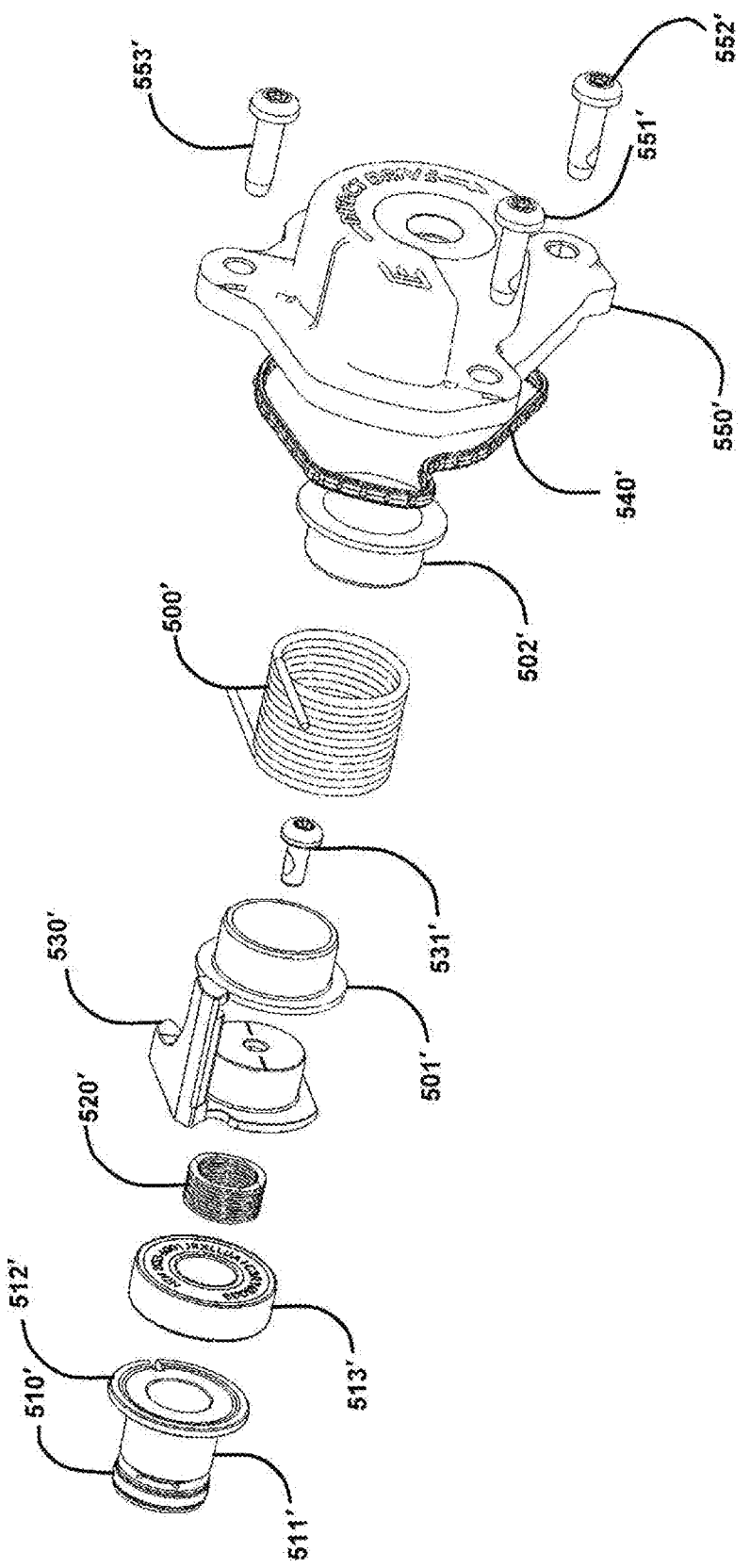
FIG. 5A is an exploded perspective view of spring assembly 50' of the alternative embodiment of large engine throttle 10' of FIG. 3A.

As an alternative to the embodiments of FIGS. 3 and 5, FIGS. 3A and 5A show a comparable but alternative embodiment. However, due to the close similarities of throttle 10' as compared to throttle 10, the parts in each of FIGS. 3A and 5A are numbered similarly to the comparable parts of FIGS. 3 and 5, with the main difference being the addition of a prime symbol ("'") for the components of the embodiment of FIGS. 3A and 5A. Particularly, with reference to FIG. 3A, most all the subassemblies of the throttle 10' are practically similar to those of throttle 10 of FIG. 3, with the most notable exception being the spring return assembly 50', which has components analogous but different from those of spring return assembly 50.

Nonetheless, details of FIG. 5A are different enough from those similar details of FIG. 5 that some description may be helpful. Particularly, component 510' of FIG. 5A is a shaft seal. In this embodiment, seal retainer 511' and 512' are merged as one component. Part 501' is a bushing separator that supports spring 500,' and screw 531' screws the assembly 50' to the end of the throttle shaft 710. D-shaped cutout in the screw 531' tend to orient the spring assembly to the desired orientation on the shaft 710. Bearing assembly 513' is a conventional bearing assembly much like bearing assembly 513 and element 520' is a bearing freeload spring. Part 530' is spring return for returning throttle blade 210 to a five-degrees-from-fully closed position. Each end of the spring 500' has projecting flare that engages mating notches and the like to drive the spring-biased return of throttle blade 210, in a manner that is generally common for many spring-biased returns for automotive throttles.

Throttle Body Assembly 20

With reference to FIG. 4, there is shown an isometric view of the throttle body assembly (also referred to as "gaseous supply throttle") 20. As previously discussed, a throttle body assembly 20 may be used for controlling fuel flow rates, air flow rates, or fuel-air mixture flow rates. The cylindrically shaped volume of space from the top to the bottom of throttle body assembly 20 is defined herein as the throttle chamber 205. For fuel throttles, the throttle orifice 200 is preferably between 50 millimeters and 76 millimeters in diameter. For fuel-air throttles, the throttle orifice 200 is preferably between 60 millimeters and 120 millimeters in diameter. Note that, although throttle orifice 200 is a circular-faced orifice in a preferred embodiment, other shapes may be used in alternative embodiments such as a square-shaped orifice.

Spring Assembly 50

With reference to FIG. 5, there is shown an exploded view of the spring assembly 50. On the left side of FIG. 5 is a throttle shaft seal 510 (with insert) that seals the throttle shaft 710 (shown in FIG. 7). A throttle seal spacer 511 separates the throttle shaft seal 510 from a seal retainer washer 512. A roller bearing 513 is located between the seal retainer washer 512 and a wave spring 520. A spring guide bearing 501 prevents torsional spring 500 from contacting or rubbing against the body of throttle 10. A larger spring guide bearing 502 separates the torsional spring 500 from a spring return flange 530. A screw-like perpendicular pin 531 located in the center of flange 530 of the spring assembly 50 serves to transmit the neutrally-biasing force of spring 500 to the shaft 710 and, in turn, to throttle blade 210. Screws 551-554 fasten the spring return cover 550 to the throttle body assembly 20, and an O-ring 540 sealingly unites the assemblies. With reference to the alternative embodiment of FIG. 5A, there is shown another exploded view of a spring assembly 50', which is structured comparably and functions in a manner generally comparable to spring assembly 50.

Thermistor Assembly 60

Figure 6:
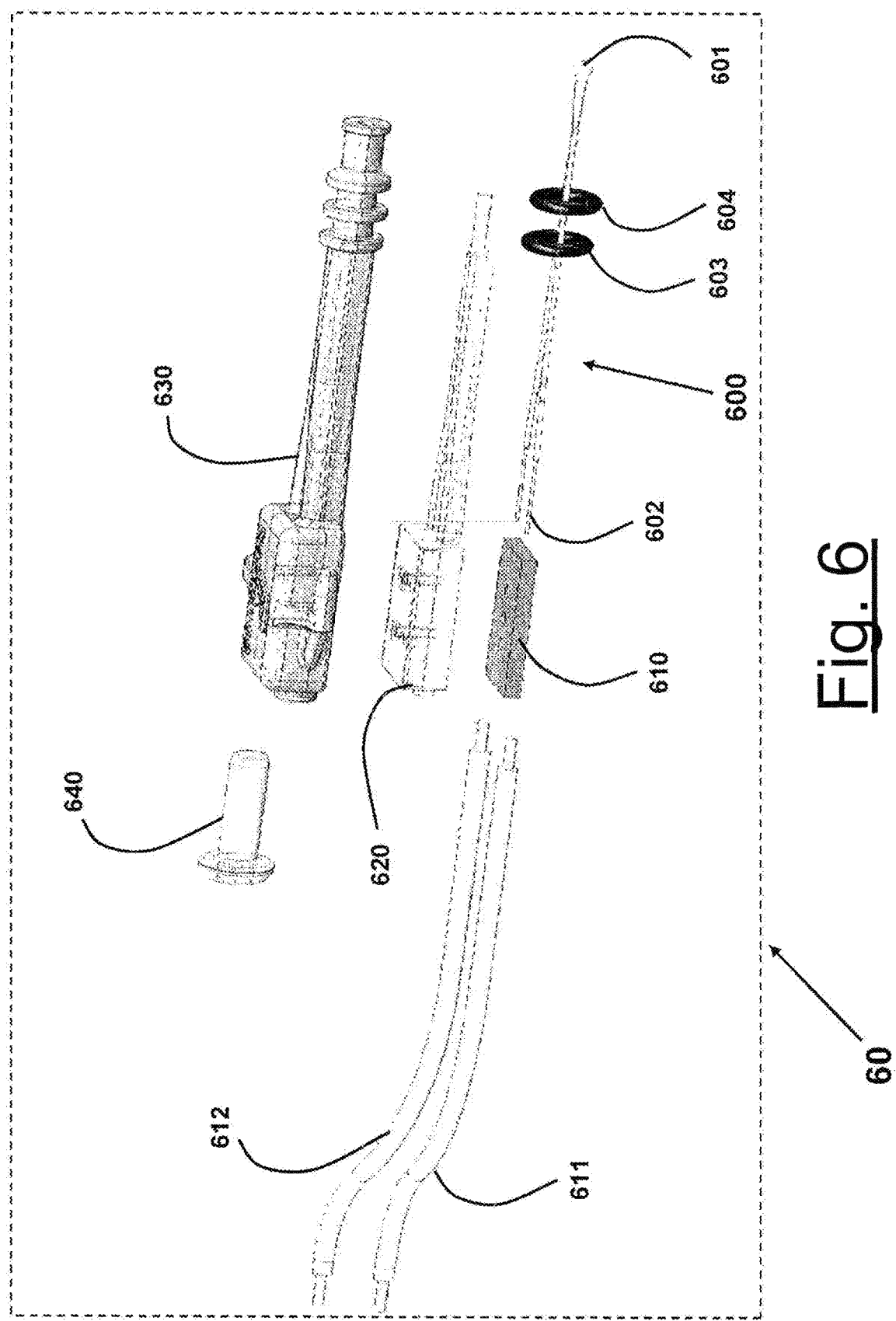
FIG. 6 is an exploded perspective view of thermistor assembly 60.

With reference to FIG. 6, there is shown an exploded view of the thermistor assembly 60. In one embodiment, the thermistor 600 has a temperature measurement range from −70° C. to 205° C. The thermistor assembly 60 has two O-ring gaskets 603 and 604 that function as sealants. Lead wires 611 and 612 are soldered to thermistor PCB 610, extend (not shown) through the intermediate housing assembly 80, and are also soldered to the main PCB 900. An epoxy overmolding 620 is used to protect the thermistor 600 and thermistor PCB 610. A thermistor tube 630 encloses the epoxy overmolding 620, thermistor 600, and thermistor PCB 610. The thermistor tube 630 is united with the throttle body assembly 20 using a screw 640.

Motor and Throttle Shaft Assembly 70

Figure 7:
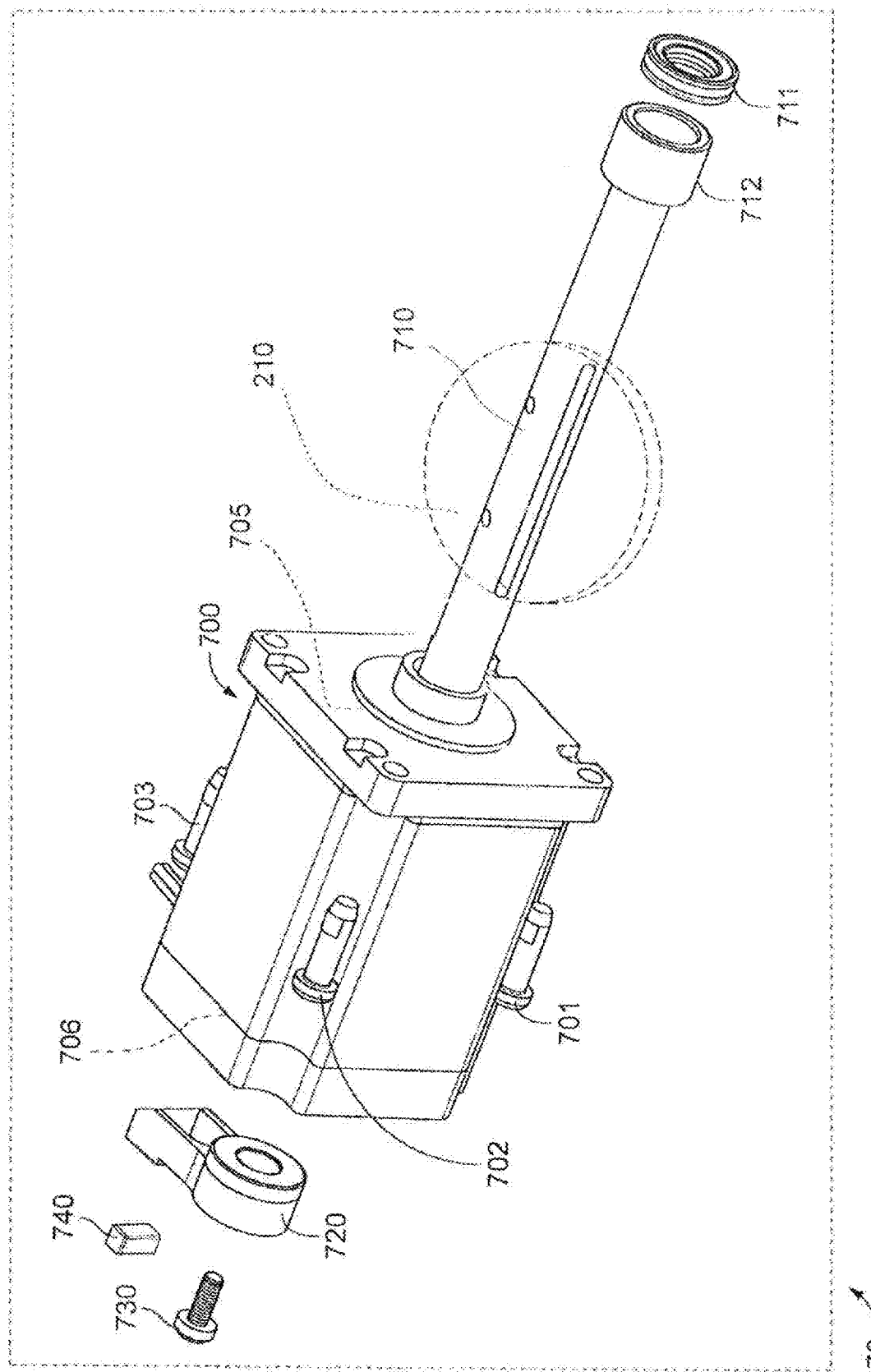
FIG. 7 is an exploded perspective view of motor and throttle shaft assembly 70.

With reference to FIG. 7, there is shown the motor and throttle shaft assembly 70. A brushless motor 700 controls the movement of the throttle shaft 710. On the right side of FIG. 7 is a throttle shaft seal (with insert) 711. A throttle seal spacer 712 separates the throttle shaft seal 711 from the throttle shaft 710. Four screws 701-704 (three shown) unite the brushless motor 700 and the throttle shaft 710 with the throttle body assembly 20. The throttle shaft 710 extends all the way through the brushless motor 700 and connects to a rotor arm 720. There are two rotary bearing assemblies 705 and 706 within motor 700 such that, together with the rotary bearing assembly 513 (or 513' in the embodiment of FIG. 3A), three bearing assemblies support the rotatable movement of shaft 710. A screw 730 integrally fastens the rotor arm 720 to an end of the throttle shaft 710 that protrudes into the PCB space from the left side (as viewed in FIG. 7) of the brushless motor 700. The rotor arm 720 has a permanent magnet 740 permanently attached to a radially outward portion of rotor arm 720, such that arm 720 can be used in conjunction with a magnet 740 to indirectly measure the position of the throttle blade 210 in its range of rotatable motion.

Intermediate Housing Assembly 80

Figure 8:
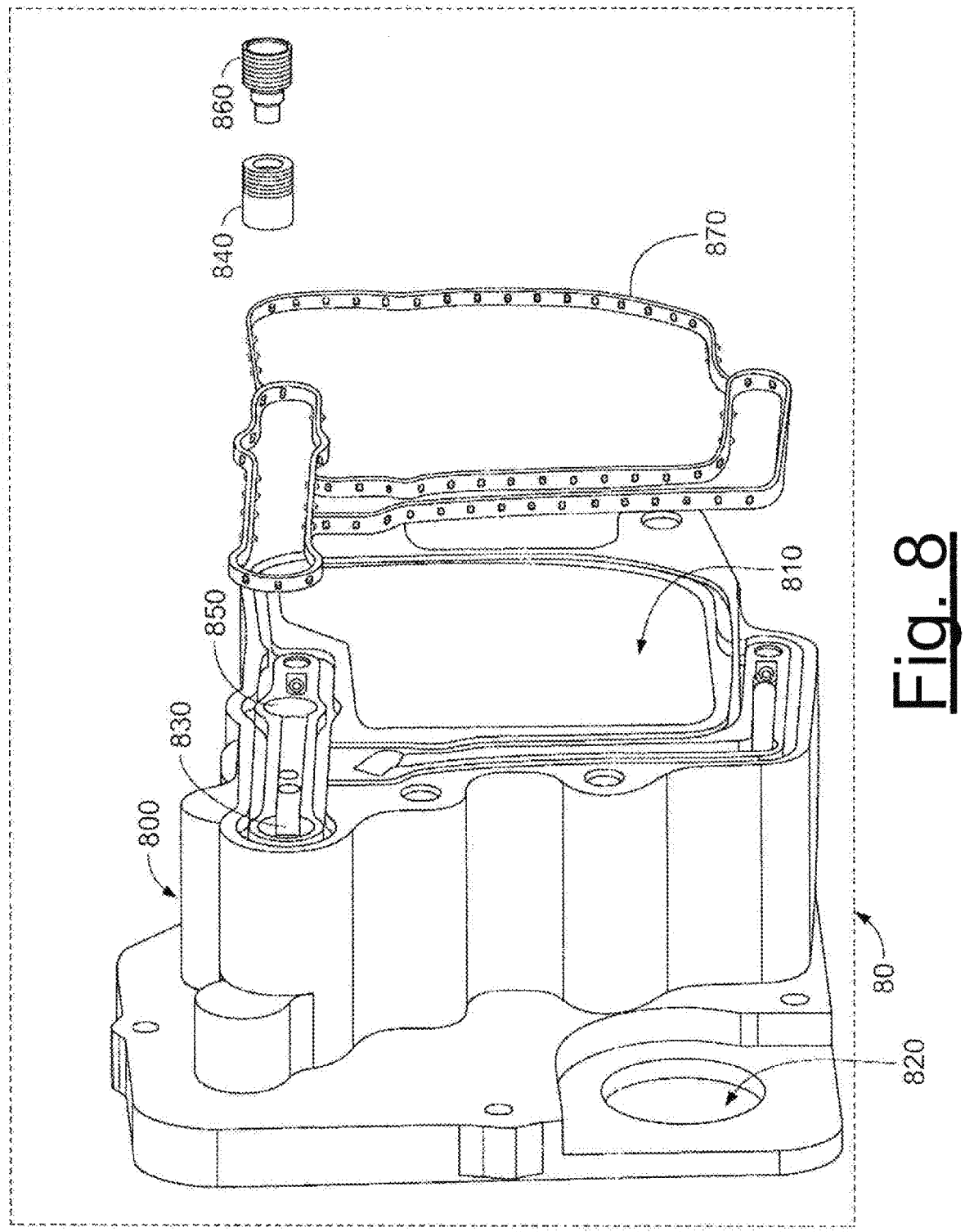
FIG. 8 is an exploded perspective view of intermediate housing assembly 80.

With reference to FIG. 8, there is shown the intermediate housing assembly 80. A large open space 810 is used for housing the brushless motor 700. A smaller circular opening 820 at the bottom left is used for housing the controller-area-network (CAN) pin connector that protrudes from the main PCB 900. One small opening 830 at the top of the assembly 80 houses a reverse flow check valve 840, to protect sensors from over-pressurization. Another smaller opening 850 houses a forward flow check valve 860 to protect sensors from over-pressurization. An in-groove seal 870 shaped to fit the intermediate housing assembly 80 sealingly unites assembly 80 to the throttle body assembly 20.

Printed Circuit Board (PCB) Assembly 90

Figure 9:
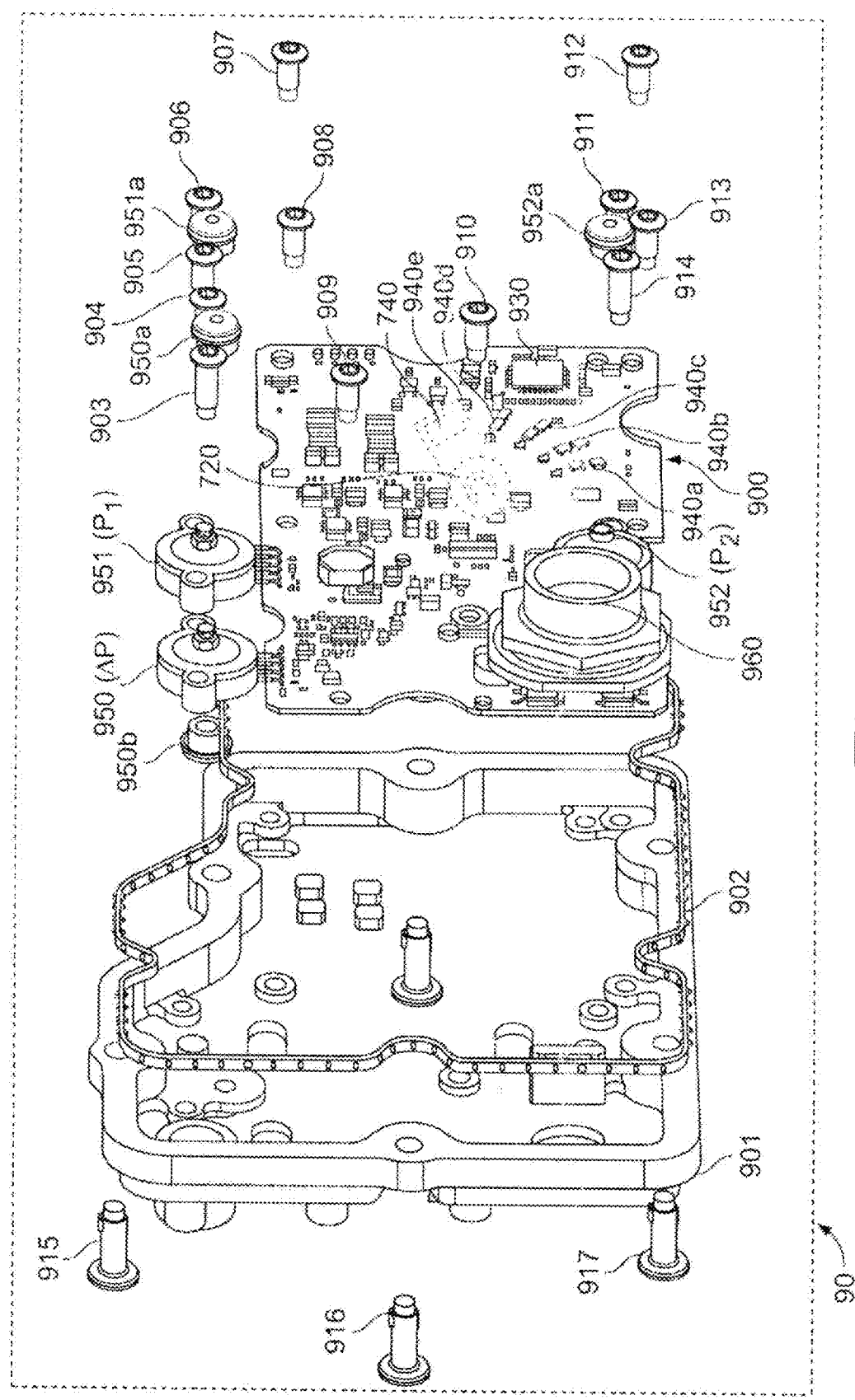
FIG. 9 is an exploded perspective view of PCB assembly 90.

With reference to FIG. 9, there is shown the PCB assembly 90, which sealingly contains PCB 900. The PCB 900 is enclosed in a space (the "PCB space") defined between a PCB housing cover 901 and intermediate housing 800, which are united by screws 915-920 in a sealed manner. The sealed union between cover 901 and intermediate housing 800 is partially enabled by an in-groove elastic seal 902 positioned perimetrically around the PCB space in the interface between intermediate housing 800 and PCB housing cover 901. Twelve screws 903-914 securely fasten the PCB 900 and pressure sensors 950-952 to the PCB housing 901. Six screws 915-920 (three shown) and a PCB housing seal 902 sealingly unite the PCB assembly 90 with the intermediate housing assembly 80 (shown in FIG. 8). Such sealed integration enables optimal control and helps minimize extraneous artifacts or other influences that might otherwise affect its operation.

PCB 900 comprises a microcontroller 930, which can be any commercially available microcontroller with a memory that is capable of receiving machine readable code, i.e., software. The microcontroller 930 provides the "brains" of the large engine throttle 10. Microcontroller 930 receives throttle position signals from Hall Effect sensors 940a-e, pressure signals from pressure sensors 950-952, temperature signals from the thermistor 600, and control signals from the ECM 100. The microcontroller 930 uses an algorithm to calculate throttle position in order to achieve the instantaneously desired mass flow rates and then outputs pulse width modulated and H-bridge signals to motor 80 to cause motor 700 to properly control the position of throttle blade 210, while also outputting measured data to the ECM.

PCB 900 has five pairs of identical Hall Effect sensors 940a-e which are part of a position sensor assembly for indirectly detecting the position of throttle blades 210. With cross reference to FIG. 10, these sensors are collectively named "Blade Position Sensor" 940. As the throttle shaft 710 rotates, the rotor arm 720 which is an integral part of shaft 710 rotates within the PCB space and this causes the magnet 740 to move relative to the Hall Effect sensors 940a-e, which are able to detect the resulting changes in the magnetic field. These sensors 940a-e vary their output voltage in response to magnetic field changes and these electrical signals are processed by the microcontroller 930. The sensors 940a-e are used for calibrating the location of the throttle blade 210 relative to the strength of the magnetic field given by the magnet 740.

Delta-P sensor 950 is a double sided pressure transducer that measures the differential pressure ("Delta-P") between the upstream pressure port 230 and downstream pressure port 240. Two pressure sensor gaskets 950a and 950b seal Delta-P sensor 950. Upstream pressure sensor 951 measures the absolute upstream pressure ("$P_1$") and has pressure sensor gasket 951a. Downstream pressure sensor 952 measures the absolute downstream pressure ("$P_2$") and has pressure sensor gasket 952a. The Delta-P sensor 950 is significantly more accurate in measuring the differential pressure than the method of mathematically subtracting the difference between $P_1$ and $P_2$. However, there are conditions when the throttle operates at pressures out of range of the Delta-P sensor 950. When the Delta-P sensor 950 begins to peg (i.e., approaches its maximum reliable limits), the microcontroller 930 will begin using pressure sensors 951 and 952 to calculate the differential pressure. Once the maximum pressure range is exceeded, the microcontroller 930 will stop using Delta-P sensor 950 and switch entirely to pressure sensors 951 and 952 in addition, PCB 900 will troubleshoot other instances whenever $P_1$, $P_2$ and/or Delta-P do not conform to rationality checks, in such cases a false signal is sent to ECM 100.

Pressure sensors 951 and 952 are conventional pressure transducers, although non-conventional ones (or even sensors or the like for fluid conditions other than pressure) can be considered for use as alternatives for some of the same purposes. Pressure transducers 951 and 952 are preferably of the type that can be and are mounted to PCB 900 and have stiff tube connectors (sometimes called "stove pipes") extending from their bases, through which the transducers access the pressure to be sensed.

To neutralize some of the effects of pressure fluctuations—particularly downstream pressure fluctuations—the control algorithms of microcontroller 930 preferably use time-averaged pressure readings from the pressure sensors 950-952 rather than instantaneous pressure readings. More particularly, based on the number of cylinders and the current RPM of the engine, as received by microcontroller 930 from ECM 100, microcontroller 930 continuously determines the stroke cycle time for the pistons of engine 102.

FIG. 10—Block Diagram

FIG. 10 illustrates a block diagram of a power system 1402, according to an embodiment of this disclosure. In the illustrative block diagram of FIG. 10, there are four main segments of supply flow depicted for preferred embodiments: (1) an upstream gaseous fuel supply 350 depicted on the left; (2) a large engine throttle 10 depicted within the dashed-line box in the middle; and (3) an engine 102 depicted in the smaller dashed-line box further to the right. The three segments 350, 10, and 102 are operatively connected to provide rotary shaft power for any number of large engine applications, with fuel supply 350 serving as the basic gaseous fuel supply for engine 102, and with large engine throttle 10 serving to provide accurate control of the gaseous fuel flowrate from that fuel supply 350 to engine 102, in accordance with various teachings of the present invention.

Upstream Fuel Supply 350

As illustrated in FIG. 10, fuel supply 350 preferably includes a fuel tank 360 serving as the source for fluid fuel, together with a mechanical pressure regulator 370 and other conventional components such as a shut-off gate valve 380. Valve 380 is preferably controlled by ECM 100, although independent control may be utilized in alternative embodiments. The gaseous fuel supply 350 is equipped and adapted to deliver a gaseous fuel supply to supply inlet 390 at desired pressure levels.

More preferably, the gaseous fuel supply 350 is a natural gas or vaporized propane fuel supply that delivers natural gas or propane stored in fuel tank 360. Though not shown in FIG. 10, fuel tank 360 may be equipped with vaporization subassemblies and controls to manage LNG (liquefied natural gas) or propane vaporization and resulting pressure within fuel tank 360 and the associated lines 365, 375 and 376. Such vaporization subassemblies and controls for LNG preferably prime tank 360 by pre-circulating some of the stored LNG through a heat exchange loop that increases the temperature of the pre-circulated LNG to the point of partial or complete vaporization, thereby creating a vapor phase with an adequate pressure head within tank 360. Line 365 preferably also includes a second heat exchanger downstream of the fuel tank 360, to further aid in complete vaporization of the LNG or propane once gaseous fuel is allowed to flow from fuel supply 350 to large engine throttle 10.

Downstream of the heat exchanger in line 365, the gaseous fuel is directed sequentially through a mechanical pressure regulator 370, a downstream fuel shut-off valve 380, and a line quick-disconnect assembly (not shown) prior to entry into large engine throttle 10. In this embodiment, initial fuel pressure is supplied by the tank 360, although the initial pressure from tank 360 is preferably regulated by mechanical pressure regulator 370 before reaching supply inlet 390 of large engine throttle 10. Mechanical pressure regulator 370 is able to manage the low pressures from tank 360 and includes one or more conventional pressure regulators that use pressure-balanced diaphragms to vary effective orifice sizes and thereby control the pressure to within the preferred range at supply inlet 390. Mechanical pressure regulator 370 preferably includes an integrated pressure sensor for providing upstream pressure data (i.e., equivalent to the pressure "$P_1$" at supply inlet 390) to ECM 100 via control link 371. Whether or not a pressure sensor is integrated with regulator 370, the preferred embodiment includes a pressure transducer 951 that measures the pressure at port 230, which is upstream of throttle blade 210 and which is in fluidic proximity to supply inlet 390, such that it is the same as $P_1$, for reliable input on the actual pressure of the gaseous supply entering throttle 10.

Assuming all lines 365, 375 and 376 are operatively sealed and connected to direct supply flow therethrough, supply flow from fuel supply 350 to large engine throttle 10 is enabled or disabled by On/Off operation of a mechanical shut-off valve 380. Although manual valves may be used in certain alternative embodiments, valve 380 is preferably motor or solenoid actuated via oversight control by ECM 100, as illustrated by the dotted-line control link 381 in FIG. 10. When shut-off valve 380 is open, gaseous supply flow is induced by an operable pressure gradient between tank 360 and supply inlet 390. Hence, with valve 380 open, fuel first moves through the heat exchanger and the mechanical pressure regulator(s) 370, and the fuel is then directed through the valve 380 and into the fuel inlet 390.

Despite vaporization subassemblies and controls, the potential exists for the passage of vaporized natural gas or propane fuel that also contains droplets of liquid phase LNG or propane, which may occur for instance if the ports or conduits for heat exchange fluids become clogged. If any LNG or propane droplets remain in the fuel stream downstream from the mechanical pressure regulator(s) 370, their subsequent vaporization may introduce dramatic pressure spikes into large throttle engine 10, which would overwhelm large throttle engine 10. In order to compensate for the possible introduction of LNG or propane droplets downstream of the heat exchanger, a pressure control loop may be inserted into the system in a position intermediate between the pressure regulator(s) 370 and the supply inlet 390 to large engine throttle 10, preferably downstream of the heat exchanger and mechanical pressure regulator(s) 370.

In the event any errant droplets of LNG or propane enter into large engine throttle 10, the delayed vaporization would likely lead to a spike of increased pressure at the supply inlet 390 of the large engine throttle 10. If such a pressure spike is produced, the inserted pressure control loop preferably buffers the spike by venting back to the upstream side of the mechanical pressure regulator 370. As other alternatives, one or more overpressure vents or bypass check valves can be included in line 375 and/or 376 to help divert vaporization spikes that would otherwise propagate and disrupt the control of large engine throttle 10. Similarly, pressure spikes due to fuel vaporization upstream of the mechanical pressure regulator can also be vented to atmosphere and/or diverted to other containment further upstream in fuel supply 350.

By providing a multi-faceted strategy for control of such errant pressure spikes, namely through the inclusion of a heat exchanger in line 365 as well as one or more of the vents, check valves or the like as discussed above, preferred embodiments control and modulate the pressure introduced to the supply inlet 390 to reduce or prevent overwhelming the flowrate control of large engine throttle 10.

The fuel tank 360 may alternatively be embodied as any of a number of commonly available gaseous fuel sources, such as stationary gas pipelines, compressed gas cylinders, or other types of liquefied storage tanks with vaporization controls, together with conventional pressure regulators and the like. Preferably, most such alternatives still include some form of a fuel storage tank 360 that feeds fuel to large engine throttle 10 via a high-pressure mechanical pressure regulator 370 which regulates the pressure to a desired range for the supply inlet 390.

Again, from the high-pressure mechanical pressure regulator 370, the fuel is fed through a fuel tube or supply line 375, which preferably includes a shut-off gate valve 380 as shown. Downstream from shut-off gate valve 380, the fuel supply line 376 is connected to the large engine throttle 10 at supply inlet 390, at which point the fuel is preferably introduced into the gaseous supply throttle 20 of large engine throttle 10.

As will be understood by those of skill in the art, the supply line 375 may also include a fuel filter (not shown) or other conventional systems for monitoring and/or optimizing fuel supply conditions prior to introduction into large engine throttle 10. Such other systems may include, for instance, fuel quality sensors connected to the engine control module (ECM) 100 and/or the PCB 900 of large engine throttle 10 for anticipating operating needs. The fuel supply 350 may also include a combination of several independent pressure regulators 370 (rather than just one), or may include additional pressure regulators that are integral to the fuel storage tank 360.

Referring again to the preferred embodiment as illustrated in FIG. 10, the large engine throttle 10 includes a fuel supply 350. Downstream of that large engine throttle 10, the supplied fuel flow is then blended with air 160 for supplying a gaseous fuel-air mix 150 to internal combustion engine 102. While the FIG. 10 arrangement is preferred, alternative embodiments in line with some broader teachings of the present invention may alternatively introduce some or all of the required air into the fuel upstream of large engine throttle 10 (as suggested by alternate air mixing flow arrow 260'), albeit with corresponding challenges and possible compromises given that corresponding adjustments may be needed to account for the air flow introduction at whichever point it is introduced.

Gaseous Supply Throttle 20

Linked to the ECM 100 of engine 102 via the communication link illustrated by dotted line 101, gaseous supply throttle 20 is adapted to provide rapid and highly accurate control of the actual m supply flowrate at its outlet 170 in response to the m flowrate signal 105, for controlled delivery of the fuel supply to the fuel-air mixer 161 and subsequently the engine 102. By its nature, gaseous supply throttle 20 is used to control gaseous supply flow from a primary fuel supply 350 (on the left in FIG. 10) to an internal combustion engine 102 (on the right in FIG. 10). Accordingly, gaseous supply throttle 20 is operatively positioned downstream of the fuel supply 350 and upstream of the fuel-air mixer 161 and engine 102, such that it is plumbed and sealed to be part of a fluidly continuous fuel supply system during operation of engine 102, with gaseous supply throttle 20 being intermediate the fuel supply 350 and the engine 102. A detailed description of large engine throttle 10 with references to additional figures is made in ensuing paragraphs.

For further optimization, the in-block microcontroller 930 and related control circuitry are preferably embodied on a single printed circuit board 900 (also visible in FIG. 9). The in-block microcontroller 930 of PCB 900 is connected via data link 101 to receive the m data signal 105 (and all other available data, including a $P_3$ data signal 121, if needed, as discussed elsewhere herein) from ECM 100. Data link 101 connects to ECM 100 and its control network, which is a CAN network in the preferred embodiment. Using the received data signals 105, 120, the printed circuit board 900 controls large engine throttle 10, preferably without any external communication other than power and data connection 101 to the engine's ECM 100. Although "CAN" is technically an acronym for controller-area-network, the "CAN" reference is a commonly used technical word that refers to a CAN network or to data received via a CAN network. On that note, it should be recognized that although a CAN network is the preferred communication link for communication of all commands, variables and other data received through line 101 by microcontroller 930 from outside of throttle system 10, wireless, analog signals, digital signals, or other communication means may be used as alternatives while still embracing many aspects of the present invention.

Also located on the PCB 900 is the CAN network connector 960 (visible in FIG. 2B). As will be understood by those of skill in the art, CAN network connector 960 is a five pin connector. The five pins comprise a power pin, a ground pin, a CAN plus pin, a CAN minus pin, and a CAN termination pin. As will be understood by those of skill in the art, alternative embodiments could be direct (0-5V or 5-20 milliamp) data connections or any other known alternative for data connections that are otherwise suitable for an application such as large engine throttle 10. Alternative embodiments may have eight pin connectors instead of the five pins for a CAN network.

In the preferred embodiment, optimal fluid condition feedback is obtained from double sided transducer ("Delta-P sensor") 950 by positioning the tips of its stove pipes (or a tube therefrom, as an alternative) in direct fluid contact with throttle chamber 205 (shown in FIG. 4), while the base of transducer 950 is mounted directly on PCB 900. With cross-reference to FIG. 2B, Delta-P sensor 950 measures the differential pressure ("Delta-P") between the upstream pressure port 230 and downstream pressure port 240. Pressure sensor 951 measures the absolute upstream pressure ("$P_1$") from port 230. Pressure sensor 952 measures the absolute downstream pressure ("$P_2$") from port 240. With further cross-reference to FIG. 2B, the stove pipe tips of pressure sensors 951 and 952 extend from PCB 900 through appropriately positioned sensor ports 230 and 240 in a side wall of throttle chamber 205. To minimize clogging or other fouling of transducers 950-952, ports 230 and 240 are preferably in a side compartment of throttle chamber 205 and are shielded through use of downwardly sloping passages or other measures as are known for use as contamination preventers.

With cross-reference to FIG. 6, optimal fluid condition feedback is obtained by positioning the sensor tip 601 of thermistor 600 directly within throttle chamber 205, while the base 602 of thermistor 600 is soldered directly to thermistor PCB 610. Thermistor 600 is a conventional thermistor that senses temperature at its tip 601 and has wire leads extending to the sensor tip 601, although other forms of temperature sensors (or even sensors or the like for fluid conditions other than temperature) can be considered for use as alternatives for some of the same purposes.

Throughout the control of in-block microcontroller 930, embodiments of the present invention address long felt unresolved needs in the field through innovative approaches that overcome many of the limitations and challenges of the prior art. In accord with many of the teachings of the present invention, the industry is enabled to provide solutions manifested in large engine control systems that are readily adaptable to the power demands of numerous applications and are readily capable of highly accurately and precisely controlling supply flow across sizable dynamic power ranges in internal combustion engines.

Engine 102

With reference again to FIG. 10, Engine 102 is a large spark-ignited internal combustion engine 102 of a type that uses gaseous fuel as its primary energy source, most preferably of a type that uses natural gas (NG) or vaporized propane (LPG) as its fuel. A large engine is defined here as any engine that is 30 liters or greater. Engine 102 is preferably used in stationary applications such as generator sets (hereinafter "gensets") on natural gas compression skids. Alternatively, engine 102 may be used in large mobile applications such as trains, ships, mining trucks or other heavy duty vehicles. As is conventional, engine 102 has an ECM 100 or the equivalent, which continually monitors the operating conditions of various parts of engine 102 and its peripheral systems. Such an engine 102 may be operatively incorporated in any number of powered applications in alternative embodiments, as well as many other applications that may be now or in the future known in the art for being powered by spark-ignited gaseous-fuel internal-combustion engines.

ECM 100 of engine 102 is connected via data communication lines 181-182 or other conventional means to monitor pressures, temperatures and operating states in or around numerous subsystems of engine 102, such as its fuel-air handling system (that preferably includes a turbo charger 172), a fuel-air throttle 140, its ignition system, its combustion chambers 180, its coolant system, its oil pressure, and its exhaust system, amongst others as are known in the art. Although alternative embodiments may use wireless connections for some or all of the data connections between ECM 100 and the various subsystems of engine 102, preferred embodiments of ECM 100 are connected to send and receive analog or digital signals through wire harnesses or other forms of communication lines 101, 181, 182, 182a, 182b, 371, and 381. Though represented in FIG. 10 by the various dotted-line communication links directly between the various components, communication lines 101, 181, 182, 182a, 182b, 371, and 381 are preferably embodied in the form of a conventional data network, such as a controller-area-network ("CAN") network.

As will be understood by those skilled in the art, ECM 100 is programmed to operate, in part, to determine the desired supply flowrate ("M" or "mdot") 105 at any given instant in time, based on current operating conditions of engine 102 in comparison to current user demands. As the desired m flowrate is determined by ECM 100, the ECM produces a corresponding m data signal 105 that represents the current m flowrate demand for engine 102. As the desired m flowrate is determined by ECM 100, the corresponding m data signal 105 is conveyed by communication link 101 to the microcontroller 930 of large engine throttle 10, and large engine throttle 10 operatively serves to instantaneously and accurately deliver as much from throttle system outlet 170.

After the flow control by large engine throttle 10, the controlled flow of gaseous supply from the throttle system outlet 170 is directed to fuel-air mixer 161 where it is preferably mixed with air 160, to produce a combustible fuel-air mix 150. Preferred embodiments use a flow of filtered air 160. The intake air 160 that is directed into the fuel-air mixer 161 may be drawn from ambient air in alternative embodiments, with or without pressure compensators, albeit with performance compromises. Fuel-air mixer 161 is preferably a venturi-like mixer or another type that does not use moving parts in the supply flow, thereby maximizing durability and fuel/air mixture homogeneity of flow conditions actually delivered to combustion chambers 180. Most preferably, fuel-air mixer 161 is in a form that includes a fuel ring, to help preserve the benefit of the accurate m flowrate control provided by throttle system 10.

Once the proper fuel-air mixture 150 is provided by fuel-air mixer 161, that mixture 150 flows toward engine 102. The fuel-air mixture 150 passes through a turbocharger 172. The turbocharger 172 takes in recirculated gas from the pre-turbo exhaust 171, mixes it with fuel-air mixture 150 and compresses it. After leaving the turbocharger 172, the fuel-air mixture 150 passes through a turbo aftercooler 174. The turbo aftercooler 174 cools fuel-air mixture 150 before it enters the engine 102. It is necessary to reduce the temperature of the fuel-air mixture to allow for a denser intake to the engine 102, thereby increasing the output of the engine 102. The post turbo exhaust gas 173 flows into a three-way catalytic converter (TWC) 175. As will be understood by those of skill in the art, the TWC 175 reduces pollutants prior to the exhaust gas being released to the environment. Although not illustrated in the drawings, those of skill in the art will understand that preferred embodiments would include various components that are not shown. Moreover, other components like filters and pressure relief valves are also not shown. With respect to any such simplifications and omissions from the drawings, it should be understood that preferred embodiments include them in such character and configuration as would be generally understood within the discretion of those of skill in the art.

The flow of fuel-air mixture 150 is controlled by fuel-air throttle 140, which is preferably an electronic throttle that further facilitates preservation of the highly accurate flowrate control provided by the supply throttle 10 in FIG. 10. Accordingly, fuel-air throttle 140 is preferably also constructed with the same basic structure and software as throttle 10, albeit preferably with adaptations to accommodate the different pressure ranges that would be experienced downstream of mixer 161 and perhaps with less protection of internal components against the corrosive effects of more concentrated fuels, as would be encountered upstream of mixer 161. Because FIG. 10 plumbs and uses throttle 10 to control the mass flowrate of the fuel itself, that type of throttle deployment is sometimes referred to as mass-flow-gas throttle (or an "MFG" throttle). In contrast, the fuel-air throttle 140 that is used to achieve highly accurate control of the mass flow of the fuel-air mixture 150 is sometimes referred to as a mass-flow-air throttle, or an "MFA" throttle, irrespective of whether or not the fuel is mixed with the air at the point of that control.

Preferably, the fuel-air throttle 140 is also constructed according to the teachings of the present invention, with the same basic structure as the supply flow throttle 10 that is used as an MFG throttle to control the mass flow of the fuel by itself. Hence, the highly accurate fuel supply flow of the MFG throttle 10 in FIG. 10 is preferably combined with highly accurate air supply mass flow control achieved by a fuel air throttle 140 constructed according to the same basic teachings as the MFG throttle 10. Alternatively, complete and highly accurate mass flow control can also be achieved by combining an MFG throttle together with an MFA throttle that is plumbed in the air supply 160 upstream of the fuel-air mixer 161. Either such combination, either the one illustrated in FIG. 10 or the alternative combination of using a similar throttle to control the mass flow of air 160 by itself, enables comprehensive mass flow control of all supply flows for combustion. Moreover, generally accurate overall control might also be attainable by just controlling the mass flow of the fuel, without actively controlling the mass flow of the air if other reliable data is used to calculate that mass flow of the air, such as through use of oxygen sensors in combination with pressure, temperature and the like. Whatever the choice for a specific application, we trust that those of skill in the art will understand where and how to include such throttles for the different purposes to achieve the different combinations for overall mass flow control.

Whatever the choice, the resulting fuel-air mixture 150 is then operatively introduced into combustion chambers 180 of engine 102 under the control of ECM 100. Within combustion chambers 180, the fuel-air mixture 150 is then operatively spark-ignited to cause working combustion.

Surprisingly, the use of such an MFG throttle together with such an MFA throttle enables a dramatically streamlined development cycle for engines. Whereas large natural gas spark-ignited internal combustion engines have historically required considerable time and expense to finalize and validate the engine design prior to commercial release, the highly accurate mass flow control of the present invention enables a greatly simplified development, conceivable without any test cell expense. Although the industry will likely continue the use of test cells for finalizing designs, the accurate controls enabled by the present invention will allow much more relaxed standards in the process, not to mention the ability to achieve highly accurate mass flow control despite highly variable quality in fuel quality, air composition, and other environmental factors.

Fuel Property Determination

In situations where the quality and composition of the fuel being supplied to an engine is known and consistent, the fuel flow is a measured and a known value, and air flow is either measured or inferred, among other variables. Based on these measurements or inferences, the engine may be accurately adjusted to achieve maximum power while remaining compliant with emissions standards. However, in situations where the quality and/or composition of the fuel is not known or is variable over time, the process for adjusting the engine can be difficult and may often require manual sensing to ultimately provide accurate mass flow of fuel based on the demands of the engine. It is in this context that the disclosed systems and methods can provide much improved automatic adjustments to the engine based on accurately determining the mass flow of air and mass flow of fuel at any given time during operation of the engine.

When fuel composition varies as the fuel is supplied over time to the engine 102, on-the-fly adjustments for maintaining efficient operation and maximum power of the engine 102 and also for keeping the engine operation within emissions compliance standards, can be difficult. In order to resolve this difficultly and more efficiently adjust the engine on-the-fly, two throttles, as shown and described herein, can be employed in a system configuration that provides the necessary data points to make real-time determinations for adjusting or calibrating the engine based on fuel quality. To achieve as much, the fuel supply microcontroller 930 (or the ECM 100 or another controller or group of controllers, in alternative embodiments) is programmed to infer fuel quality characteristics using a process as represented by the flowchart of FIG. 11A, described further below.

In keeping with at least some aspects of the system as illustrated in FIG. 10, two throttles are provided: one as a mass-flow-gas (MFG) throttle 20 and the other as a mass-flow-air (MFA) throttle 140.

Looking to FIG. 11A, shown is a simplified flowchart that is representative of methods used to infer fuel properties of a fuel supply, wherein the fuel supply has unknown fuel properties. In some embodiments, the methods of FIG. 11A is performed by ECM 100. More particularly, FIG. 11A illustrates the determination of the mass flow of the fuel ("MFG") at step 420, and the mass flow of the air ("MFA") at step 415. Beginning at point 400, the mass flows of air and gas are determined first, shown as step 410. At step 415, the actual mass flow of air is determined from mass flow sensors located in the MFA throttle 140. Moving to step 420, an actual mass flow of gas is determined using an algorithm programmed in the MFG throttle 20 microcontroller. At step 430, the exhaust gas oxygen levels are read by the EGO sensor 190; this step provides the actual air-fuel ratio, whereby an air-fuel ratio offset value can be determined. The process for determining offset values for the air-fuel ratio and other engine operations will be discussed in later sections. The controller 930 (or another controller or combinations of controllers in alternative embodiments) is able to determine the mass flow of both the fuel and the air through use of two throttles 10 embodied according to the teachings of the present invention. The controllers determine results of combustion through monitoring of oxygen sensor 190. In FIG. 10, oxygen sensor 190 is positioned in the exhaust manifold, downstream from the MFA 140, and preferably in the form of an exhaust oxygen sensor. As such, sensor 190 is positioned and configured to sense the oxygen content in the exhaust. The oxygen sensor 190 will provide a measurement to the ECM 100 of oxygen concentrations or deficits in the exhaust gas. The oxygen levels in the exhaust can be correlated to characteristics of either a rich or lean air-fuel ratio. As it is known by those of skill in the art, the term "rich" is used to describe an air-fuel ratio that has more fuel than air. Inversely, the term "lean" is used to describe an air-fuel ratio that has more air than fuel. With respect to engine performance demands, a rich or lean air-fuel ratio may be desired to achieve certain load limit applications. The quality of the fuel also may determine if an air-fuel ratio is rich or lean. Natural gas directly from a wellhead has inconsistent chemical compositions. Depending on the source, unrefined natural gas will have properties associated with concentrations of any it's constituent gases. Typically, natural gas has high concentrations of Methane CH4; however, amounts of Ethane C2H6, Propane C3H8, Butane C4H10, Pentane C5H12, and Hexane C6H14 may also be found. Methane, being the lighter fuel, will show lower oxygen levels in the exhaust. Heavier fuels, like Propane and Ethane, will show higher oxygen levels in the exhaust. It should be noted, such mass flow determinations are determined by the throttle controllers in the course of operating the throttles 20 and 140 in the preferred configuration illustrated in FIG. 10. At step 440, fuel properties can be interpolated based on the offset values. A feedback loop, shown as arrow 450, transmits engine operation offsets to respective equipment, wherein the MFG throttle 20 and MFA throttle 140 are adjusted to meet engine demands. At step 460, fuel properties are then inferred based on the methods described while referencing FIG. 11A and additional methods described in later sections.

FIG. 11B is a flowchart intended to further explain, in more detail, the methods described in FIG. 11A. As will become evident in the discussion below, certain methods described in FIGS. 11A-11B can be referred to as a fuel-air determination loop. In some embodiments, the method of FIG. 11B is performed by ECM 100. Looking at the starting point 400', the initial fuel properties and variables are assumed at step 401. Specifically, various assumed properties of the fuel being supplied from fuel tank 350 are programmed to a memory of the ECM 100. In some embodiments, the properties stored to the ECM 100 include the Stoichiometric air-to-fuel ratio, the specific gravity of the fuel, and a ratio of specifics heats of the air and the fuel. In some embodiments, as will be discussed in greater detail below, the fuel of tank 350 is supplied directly by a natural source of the fuel, such as a natural gas well, for example. In these embodiments, the various fuel properties of the natural gas or other fuel are unknown since the natural gas is largely unprocessed and delivered from a natural source of natural gas. Accordingly, fuel properties of the natural gas may be inconsistent and generally unknown. Accordingly, the assumed properties of the fuel and air are programmed to the ECM 100, and are used by the ECM 100 in determining the mass flow rates of air and fuel coming into the engine 102, which can then be used to determine certain fuel properties of the fuel, as will be discussed in greater detail below. Unlike the fuel supplied to the IC engine 102 from a natural source, properties of ambient air are relatively certain and known no matter where the air is supplied from. Accordingly, in making various determinations and calculations discussed in detail below in determining the mass flow rate of air, the assumed property values of ambient air programmed to the ECM 100 can be considered by the ECM 100 to be the true property values of air supplied to the engine.

The mass flow of air and the mass flow of fuel are calculated by ECM 100 at step 404 based on current inputs 403 from MFG 10 and MFA 140 in combination with the assumed fuel and air properties saved to the ECM 100 in step 401. ECM 100 calculates the mass flow of fuel through MFG 10 using various readings 403 from the MFG 10 and the assumed fuel properties stored to the ECM 100. Specifically, ECM 100 calculates the mass flow rate using the assumed fuel properties programmed to the ECM 100 memory in addition with pressure readings from pressure sensors 950-952, temperature readings from thermistor 600, and/or position readings from the blade position sensor 940. The ECM 100 calculates the mass flow rate of air through the MFA 140 in substantially the same way as the mass flowrate of fuel is calculated through the MFG 10. As has been previously described, MFA 140 has substantially the same components and structure as MFG 10, and thus is configured to take the same pressure, temperature, and blade position readings of air flowing through MFA 140 as MFG 10 is configured to take of fuel flowing through MFG 10. In viewing FIG. 10, those with skill in the art will understand that an air-fuel mixture passes through MFA 140, not just air. Because the mass flowrate of fuel passing through MFA 140 is calculated using readings from MFG 10, the ECM 100 is configured to account for the fuel passing through MFA 140 and calculate a mass flow rate of just the air passing through MFA 140. In addition to inputs 403, offset correction values, shown at step 430', applied to the MFG 10 and MFA 140 actuators are also factored into determining the mass flow of air and mass flow of fuel. At step 402, the true air-fuel ratio, shown as AF Ratio, is determined. The true air-fuel ratio is determined by the ECM 100 using mass flowrates of the air and fuel determined in step 404. At step 405, the ideal air-fuel ratio, shown as ideal AF ratio, is determined during calibration of the IC engine 102 based on the on type of IC engine 102 and catalytic converter being used with it and is preprogrammed to EMC 100 for ECM 100 to use in making determinations and calculations, as will be discussed in more detail below.

The percent error of the air-fuel ratio is calculated at step 406 by comparing the true AF ratio from block 402 with the ideal AF ratio from step 405. The MFG 10 and MFA 140 offsets used at step 430' are determined at step 408. The MFG 10 and MFA 140 offset determinations are based off of input 407 from the current EGO sensor 190 measurements. Specifically, the oxygen sensor 190 readings in step 407 are used to provide an independent measurement of the true air-fuel ratio based upon the oxygen concentration in the exhaust. If the air-fuel ratio result determined in step 402 and the oxygen sensor AF ratio result from 407 are the same, then the percent error in 409 should be 0%. If however, there are differences, say due to a change in actual fuel properties which deviate greatly from what is input at step 401, then the percent error will be something higher or lower than 0%. As will be discussed in greater detail below this percent error is what the changes described in step 440' are based upon. If there are no corrections needed, shown as the YES direction at step 409, then fuel properties can be interpolated using the calibrated lookup tables, referred to as fuel tables in step 440', and the percent error of the air-fuel ratio. At step 440', ECM 100 can be said to perform a fuel property determination and adjustments program, where the ECM 100 is configured to adjust operations of the engine 102 based on a fuel property value of the fuel supplied to the engine 102. An example of performing the fuel property determination and adjustments program is shown in FIG. 11C and a fuel table associated with the program can be seen in FIG. 12. The fuel properties then can be used as desired shown at step 460'. For example, in some embodiments that are discussed in greater detail below, in step 460', fuel properties determined in step 440' can be sent to a pump 1404 (referencing FIG. 14) that pumps the natural gas fuel from a natural gas well 1408, and the pump 1404 can use the determined properties to more efficiently pump the fuel.

If corrections are needed, shown as NO at step 409, then MFG 10 and MFA 140 actuators need to be adjusted, shown at step 430' and the ECM 100 restarts the fuel-air determination loop. For example, if the percent error value in step 406 is compared to the inputs from the sensor 190 in step 407 and the ECM determines that the ai-fuel ratio is too rich in fuel, the ECM 100 can control the MFG 10 to restrict the amount of fuel supplied and/or open the MFA 140 to mix more air with the fuel supplied. Similarly, if the percent error value in step 406 is compared to the inputs from the sensor 190 in step 407 and the ECM 100 determines that the ai-fuel ratio is deficient in fuel, the ECM 100 can control the MFG 10 to increase the amount of fuel supplied and/or restrict the MFA 140 to mix less air with the fuel supplied.

The ECM 100 uses an engine integrated control system ("EICS") that is linked up to a database program that includes calibratable manufacturer suggested engine ratings. The database enables the EICS to access numerous manufacturer suggested engine specifications. To further elaborate how the database is used in the present disclosure, there are specific fuel properties that a fuel supply must maintain to ensure optimization of engine performance. To simplify the concept, a fuel with properties similar to gasoline will have adverse effects on an engine designed to operate on fuel with properties similar to diesel, furthermore gasoline and diesel can have various octane numbers that are associated with increasing levels of engine performance. The engines associated with the present disclosure are designed to operate on natural gas that, much like the octane number, can be rated with a methane number or BTU content. The fuel properties of the fuel supply can be compared to the manufacturer suggested fuel properties, thus enabling the EICS to calculate associated offset values. The stoichiometric air-fuel ratio is a theoretical value that, with a known or estimated mass flow of air, can be used to calculate a theoretical mass flow of gas. As it is known by those of skill in the art, a simple method for calculating the air-fuel ratio is to divide the estimated mass flow of air by the mass flow of gas. This convention coincides with the ECM's 100 ability to instantaneously demand a specific mass flow of gas depending on performance needs. To obtain a value for a desired mass flow rate of gas, the ECM 100 conducts a percent error analysis, shown at step 406 in FIG. 11B, that quantifies the accuracy of the actual air fuel ratio to the ideal air-fuel ratio. This analysis is used to determine the proximity of actual mass flow values to desired mass flow values, wherein offset values are determined, shown in block 408. The offset values demanded by ECM 100, whereby the MFG throttle 20 is adjusted to meet said offset values Similarly, the mass flow of air can be determined such that the MFA throttle 140, positioned downstream of the MFG 10, provides the mass flow rate of air to the ECM 100. For the purposes of describing the current disclosure, the mass flow of air will be treated mathematically as a known or estimated constant, therefore MFA 140 adjustments will not be explicitly described. However, MFA 140 adjustments are within the capabilities of the current disclosure. The methods for achieving MFA 140 adjustments are identical or similar to achieving MFG 10 adjustments. Note that it should be understood that the MFA throttle 140, when positioned downstream of the air intake and downstream of an air/fuel mixer 161 where the air is mixed with the fuel, would actually be measuring the mass flow of a mixture of air and fuel, such that the mass flow of the air would be determined by subtracting the mass flow of the fuel from the mass flow of the mixture. It should be understood, nonetheless, that a second throttle in certain alternative embodiments can be positioned in an air supply upstream of fuel-air mixer 161 such that it directly determines and controls the mass flow of the air rather than the mixture.

As previously mentioned, unrefined natural gas has discontinuities of chemical composition that, if routed directly from a natural gas well head to an on-sight engine, lead to volatile engine performance due to inconsistent fuel quality. In addition to conducting an air-fuel ratio error analysis, as described at step 440', the ECM 100 also conducts closed-loop error corrections, which then can be used to infer fuel properties. The closed loop error corrections are made using the resulting percent error value described at step 440'. By utilizing closed-loop correction, exact fuel property values, such as BTU content" BTU" and Methane number "MN", can be interpolated based on fuel tables, shown in FIG. 12, or response curves, shown in FIG. 13, included in the database of manufacturer's suggested engine ratings. The exact fuel properties can be determined due to precise control of the mass-flowrate of fuel and air controlled by MFG 10 and MFA 140. Accordingly, because the mass-flowrates of air and fuel are precisely controlled and known, the ECM 100 is able to deduce that the only factor preventing the air-fuel ratio from being ideal is a fuel property value (such as the BTU level) being different from what is the BTU level assumed and used in creating the assumed property values saved to the ECM 100 (in step 401).

Looking to FIG. 11B—at step 440'— fuel quality can be inferred from the air-fuel ratio closed-loop error corrections generated from the ECM 100. Assuming the engine has been calibrated to operate with certain fuel specifications, fuel properties can effectively be interpolated from a table of properties known to be associated with the calculated error interval. Using a database program, such as for example GERP, at step 420', fuel specifications recommended by the engine manufacturer are accessed and used to infer fuel properties based on the closed-loop error. For example, if an engine is calibrated to operate with propane as the base fuel, there will be a closed-loop error associated with the characteristics of the incoming fuel source. The closed-loop error determines the amount of correction needed to achieve properties similar to the base fuel. In the current disclosure, corrections made to the MFG 10 and MFA 140 throttle positions are described, however corrections to other equipment settings may be applicable to alternative embodiments.

It should also be understood that, as suggested by the feedback path 450 in FIG. 11A, that the inferences about fuel quality can be iteratively improved by using the inferred fuel quality characteristics in the next determination of mass flows at step 410.

Typically during engine operation, if it is determined through measurement that the air/fuel ratio changes from the preferred ratio (rich, lean, or stoichiometric) based on the particular application, one can expect that the change results from either a change in the air or a change in the fuel. More specifically, for a given calibrated engine 102, changes in closed-loop correction are likely related to air flow changes or fuel flow/fuel property changes. Since air flow for a given speed and load condition can now be measured, changes in closed-loop correction can more likely be attributed to fuel property changes. Thus, properties related to air flow are unlikely to change and can be monitored with an oxygen flow sensor 190. However, given that the above-identified parameters are known based on the configuration of the MFG throttle 20, the MFA throttle 140, and the oxygen sensor 190, it can be more accurately inferred that there has been a change in the fuel, more particularly a change in the fuel composition or fuel properties. A number of fuel properties may be inferred based on the known data related to the mass flow of fuel, mass flow of air, and the air/fuel ratio. These fuel properties can include, but are not limited to, British Thermal Unit (BTU) content, Wobbe Index, methane number, stoichiometric fuel/air ratio, specific gravity of the fuel, hydrogen/carbon ratio, ratio of specific heats of the fuel, etc. Although the following description particularly references BTU content, it should be understood that any of the identified fuel properties may be inferred. Nonetheless, generic reference is sometimes made to either "fuel property" or "fuel quality", which should be interpreted as all-encompassing generic references to any of those fuel properties mentioned above, as well as to still any other fuel quality properties that characterize the quality of natural gas in fields related to natural gas engines.

By knowing the mass flow of air, the mass flow of gas, and the air/fuel ratio, the disclosed system 10 can infer the BTU content of the gas. All of these parameters are then supplied to the ECM 100. In turn, knowing the BTU content of the gas, the ECM 100, by execution of its proprietary software, is programmed to automatically adjust particular engine settings to maintain efficient engine operation that results in appropriate power output and preferably maintaining the engine operation in compliance with applicable emissions standards. For instance, changes can be made to phi targets (pre- or post-catalyst), spark timing, and/or maximum allowable load based on the BTU input. Furthermore, another check can be used whereby spark timing is adjusted and knock level is measured with a knock sensor (not shown). This can help correlate the expected relationship between BTU content and methane number.

One general application in which the above principles and system configurations are especially beneficial is engines incorporated in various applications in oil and gas fields. This includes, but is not limited to, generator packages driving downhole electric pumps, engines incorporated into gas compression systems, and other like uses. For example, certain applications in oil and gas fields incorporating an internal combustion engine can be supplied fuel, with the fuel being the gas from a gas well. Because the composition of the gas out of the well varies over time, the BTU content of such gas is typically unknown without a person on-site taking measurements to determine as much, for instance using a gas chromatograph. Instead, as with the currently described systems and methods, having the ability to more accurately determine the BTU content of the gas out of a well without having to physically take measurements but relying on the information gathered by using the systems and methods as herein described, clearly represents an improvement, particularly when it is crucial to be able to distinguish between buy-back gas and sell gas based at least in part on the composition of the gas.

To further elaborate, on typical systems having an internal combustion engine being supplied with gas directly from a well, a person would have to physically visit the site to enter particular setup points for the operation of the engine. The gas is measured, the methane number of the gas is determined, the spark timing can be set based on known information, and based on all of that information, the engine might be derated. Because the composition of the gas out of the well often fluctuates, in order to keep the engine operating with emissions standards, a person must physically be on site and make adjustments to the engine for this purpose. Utilizing the disclosed system and methods, particularly providing an MFG throttle and a MFA throttle that allow for very accurate measurement of fuel and air, the composition of the gas (BTU content) can be accurately inferred and the adjustments to the internal combustion engine in this scenario can be done without requiring physical intervention.

In particular applications, on-the-fly closed-loop corrections can be made with respect to the fuel supplied to the engine 102 when the system 10 infers one or more fuel properties, and based on that determination, a correction is required. Fuel flow is measured and a known value. Using oxygen sensor 190, the air/fuel ratio is determined, and that value is communicated to ECM 100. Thus, the fuel flow and air flow are known. In order to accurately determine whether a closed-loop correction is necessary, alarm faults are setup in ECM 100. These alarm faults are calibratable. For instance, if the closed-loop correction value is zero, this indicates that no intervention is necessary to change the fuel flow. However, if the closed-loop correction value is −15, this indicates that the system 10 has to pull back 15% of the energy or the BTU content or the fuel flow rate. In other words, to maintain sufficient power, ECM 100 commands that mass fuel flow be reduced by 15% in order to maintain the preferred air/fuel ratio. In this given example, alarm faults of +/−15% can be set in ECM 100, such that if the indication is that the air/fuel ratio is off by +/−15%, ECM 100 will command an increase or decrease of the mass fuel flow to return the air/fuel ratio to the preferred value. Fault alarm settings are dependent on the particular application in which MFG throttle 20 and MFA throttle 140 are employed. Furthermore, because the mass flow of fuel, the mass flow of air, and the air/fuel ratio are known, knowing the closed-loop correction value, particularly a value other than zero, indicates to an operator that the fuel properties have changed.

It will be understood that another application of the systems herein described that is contemplated is the use of the large engine throttle strictly as a metering device such as may be used on a gas pipeline. Given that the large engine throttle is accurate for measuring flow, particularly in a low-pressure application such as a large pipeline, wherein the difference in upstream and downstream pressures is small, the application of the large engine throttle as a flow metering device can replace more complicated and/or more expensive devices and techniques.

It will be understood that still another application that can benefit from the systems and methods herein disclosed is use in gas compression systems in oil and gas fields. More particularly, once the fuel property information has been determined, the ECM 100 can output that fuel property information for a variety of other important uses, such as is represented at step 460 of the flowchart in FIG. 11A. As an example, the fuel property information can be sent to a compressor that is compressing the same general supply of natural gas for more accurate prediction and control of compressor power, as well as compressor and internal stage information. Turning to FIG. 11C, shown is the strategy for determining fuel properties such as fuel quality, load limit offset, phi offset, and spark offset by performing a fuel property determination and adjustments program. FIG. 11C elaborates further the methods used to determine the concepts in FIG. 11A and FIG. 11B. Although FIG. 11C explicitly describes methods to determine fuel quality, load limits, phi offset, and spark offset, other properties, such as BTU content, can be determined with similar methods. For demonstrative purposes, FIG. 11C includes various sections that are bracketed for quick reference. The section shown with bracket 1050 includes the process used to determine a closed-loop error associated with the air fuel ratio of a fuel supply with unknown properties. The section shown with bracket 1051 includes the interpolation methods for determining fuel quality, spark advance, and load limit.

Looking at starting point 1000, the true mass flow of air 1001, shown as mdot_a_i, determined from mass flow sensors in the MFA 140 throttle, represented as box 1002. Various alternative embodiments may utilize only one mass flow throttle. Some of those alternative embodiments will use MFG for controlling the mass flow of gas to the extent that corresponding assumptions can be made about the mass flow of air. Looking to box 1003, the true mass flow of air 1001 is divided by the true mass flow of gas, shown as 1/mdot_g_i, based on sensed readings from the MFG 10 throttle control algorithm 990, represented as box 1002'. The output from box 1003 is the true air-fuel ratio 1004, shown as AF_i. The true air-fuel ratio 1004 is subtracted from the ideal air-fuel ratio 1005, shown as AF_stck. The ideal air-fuel ratio 1005 is determined using methods represented in box 1028, the values and methods represented in box 1028 are determined as a part of the engine calibration process. Specifically, an ideal air-fuel ratio for an IC engine 102 is determined according to the type of IC engine 102 used and the particular catalytic converter paired with the IC engine 102. Accordingly, when the type of IC engine 102 and its catalytic converter are known, the ideal air-fuel ratio I known based on calibration processes done in testing and can be pre-programmed to the ECM 100 for the ECM 100 to use in performing the determinations and calculations described herein. The air-fuel differential 1007, shown as delta_AF_i, between the true air-fuel ratio 1004 and the ideal air-fuel ratio 1005 is calculated. Then, represented in box 1008, the air-fuel differential 1007 is divided by the ideal air-fuel ratio and multiplied by 100, which results in a percent error value 1009. The percent error value 1009, shown as +/−e, branches off to be used in determining fuel properties, which will be discussed later, and in determining adjustments for the MFG throttles 20. Use of the percent error value for determining throttle corrections will be referred to as closed-loop corrections, whereby the representative "loop" process is enclosed by the dashed box 1014. The percent error is multiplied, represented as box 1010, by the true air-fuel ratio 1004, which results in an air-fuel ratio adjustment value 1011, shown as +/−AF_adj. The air-fuel adjustment value is transmitted to the throttle microcontroller 930. As previously mentioned, if the mass flow of air is known, estimated, or held constant, adjustments to air-fuel ratio can effectively be made by adjusting the mass flow of gas. For the purposes of describing the current disclosure in terms of simple inputs and outputs, the throttle control algorithm 990 is shown in FIG. 11C as receiving the air-fuel adjustment in the form of a demanded mass flow of gas value 1012, shown as mdot_g_0. The throttle control algorithm 990, with the use of formulas described later, correlates the demanded mass flow to a specific blade angle 1013, whereto the MFG throttle 20 will adjust.

Looking back to the percent error value 1009, this value is also used to determine fuel properties. The percent error value 1009 is associated with an instantaneous air-fuel ratio. To determine fuel properties of the fuel supply, Calibrated Lookup Tables, represented as box 1006, must be used, whereby fuel properties can be interpolated. An example of the calibrated lookup table can be seen as table 1200 in FIG. 12. The calibration method associated with the current disclosure includes the determination of percent error values associated with known fuel types. For example, assuming an engine is designed to operate on propane, the calibration process would include operating said engine with other known types of fuel where the properties are already known.

As the fuel type drifts further from propane, there will be an air-fuel ratio percent error associated with said fuel type; propane would have an error of 0%. To elaborate further, if a fuel like Butane were to be used in the calibration process for an engine designed to operate on propane, there would be an air-fuel ratio percent error associated with Butane. Outside of the calibration process, if the percent error value 1009 were to be between the values of Butane and Propane, then the properties of the unknown fuel could theoretically be interpolated with some degree of accuracy. Moving forward, the percent error value 1009 is entered into the Calibrated lookup tables. The result is then used in a standard interpolation equation, shown in box 1018*a*, whereof variable y represents the fuel quality. It will be evident to those of skill in the art, how to apply the equation shown in 1018*a*, 1018*b*, 1018*c*. The interpolation equation is also used, with other inputs, to determine the engine's spark advance, as seen in box 1018*b* and load limit, as seen in box 1018*c*. Although it is not shown, BTU content of the fuel supply is determined using methods similar or identical to determining Fuel Quality. The equation shown in box 1018*b* is used to solve for the demanded spark advance, Inputs for equation 1018*a*, 1018*b*, 1018*c*, with the exception of the percent error value 1009, are determined from the calibrated lookup table 1006. Looking back to equation 1018*b*, the output is the spark advance 1027 adjustment of the combustion chambers 180, whereof would be demanded by the ECM 100. It should be known to those of skill in the art, that spark advance refers to the combination of ignition timing as it relates to piston position and crankshaft angle, and can also be referred to as a spark time sequence.

Looking to the output of equation in box 1018*c*, where y represents the ideal load limit. The ideal load limit 1019, value, shown as LL_0, is used to determine the maximum blade angle of the MFA throttle; the methods used to determine the max blade angle are represented as box 1024. The output of box 1024 is fed into the throttle algorithm 990, wherein the blade angle 1013' of the MFA throttle 140 will not violate the maximum blade angle value. That is to say, the load limit of the internal combustion engine 102 is adjusted by the ECM 100 by the ECM 100 setting maximum throttle blade limit of the MFA 140. By setting a maximum limit, the load limit of the IC engine 102 is limited by the amount of air allowed to enter the combustion chambers 180. For example, in some embodiments, to lower a load limit of the IC engine 102, the ECM 100 can adjust MFA 140 to limit the air to enter the IC chambers 180. Further, according to other embodiments of the disclosure, to limit the load limit of IC chambers 180, ECM 100 can similarly set a limit to the angle of the throttle blade of the MFG 10.

Looking back equation 1018*a*, the determined fuel quality 1025 of the fuel supply is used to determine the ideal phi value 1028, or can be reported 1034. The fuel quality can be reported as a BTU content or a methane number. It should be noted that FIG. 11C is intended to aid in describing the concepts of the current disclosure, wherein methods for determining other associated fuel properties are beyond the scope of the description's purpose.

Fuel Quality Control Strategy

Looking to FIG. 12 and FIG. 13, FIG. 12 is a representative fuel table 1200 as previously described in the example of the calibration process from the previous section. Table 1200 is programmed to EMC 100, such as to a memory of ECM 100, for the ECM's 100 reference while performing the fuel property determination and adjustments program. Referencing the calibration example, the estimated closed loop error associated with propane, along with the fuel properties, is shown in row 1201. If the systems closed loop error, calculated by the ECM 100 in step 406 described above, falls between two known closed loop errors, shown for demonstrative purposes as 1203, then the rows above and below the system's value are used to interpolate any desired fuel property. The manufacturer specifications are shown in columns 1202. In the example illustrated a closed loop error of 0% corresponds to an ideal BTU value of 900 BTU/scf and an ideal methane number of 98 MN, and in this ideal scenario, the spark advance and load limit of the engine 102 do not need to be adjusted by the ECM 100. However, as seen in FIG. 12, as the BTU and MN values deviate from the ideal numbers, the ECM 100 adjust the spark advance and the load limit proportional to the amount by which the BTU and MN values are different from the ideal values.

FIG. 13, shows a response curve 1300 used to determine the fuel quality of a fuel source. Depending on the value of the load limit, calculated using the previously described interpolation method, a maximum load limit is associated with 100% to 75% natural gas 1303, whereof the fuel quality would be reported as 100 to 75. A minimum load limit is associated with 0% natural gas and 100% propane 1304. Because there is no slope between 100 and 75 fuel quality, load limits between points 1301 and 1302 would result in an observable fuel quality. Point 1301 is at 75% fuel quality and point 1302 is at 0% fuel quality.

The fuel quality control feature of the current disclosure uses an Engine Integrated Control System ("ECIS") to determine simplified fuel quality data that may be useful to onsite personnel. The ECIS has interactive software that allows a technician to input fuel property values for calibration. The software also allows the technician to manipulate the modes of ECIS operation. Depending on if the fuel quality control feature is in static or dynamic mode, the fuel quality data can also be used to determine the aforementioned MFG throttle 20 or MFA throttle 140 adjustments necessary to maintain engine performance.

Common methods for determining fuel quality from a natural gas wellhead involve measurements of BTU content and Methane Number, however, inexperienced technicians or other personnel may have difficulties interpreting the measurements. With the teachings of the current disclosure, a simple 0-100 percent scale can be used to describe the quality of fuel from a natural gas wellhead. A simplified response curve, shown in FIG. 13, illustrates the relationship between fuel quality and engine load limits. The 0-100 scale is effectively a ratio of the fuel supply's natural gas content to propane content, whereas natural gas "NG" has a fuel quality of 100% and liquid propane gas "LPG" has a fuel quality of 0%. For example, a reading of 25% fuel quality indicates that the wellhead produces fuel that behaves as a mixture of 25% natural gas and 75% propane.

Utilization of the current disclosure's fuel quality control feature is dependent upon the AFR closed-loop error offset value. The closed-loop error offset value is entered into a fuel calibration table similar to the table shown in FIG. 12 and uses block multiplication to interpolate values for BTU content, AFR "phi", spark advance, and fuel quality. The interpolated values are used to determine offset values that are demanded by the ECM 100. The conceptual paths for interpolating said values can be seen in FIG. 11B. Upon startup of the ECIS, a base fuel BTU value is used to initialize the system. The fuel quality control feature is automatically enabled if the incoming fuel is natural gas, however, if the incoming fuel type is different or manually switched, the closed-loop error generated from the NG calibration will remain constant; in other words, any fuel error adjustments will remain relative to the NG properties.

As previously mentioned, the fuel quality control feature has the capability to operate in a dynamic mode or a static mode. When dynamic mode is enabled, the closed-loop error offset value is used to initialize the EICS fuel table block multiplier and continuously updates BTU content and MN with respect to the MFG 10 and MFA 140 provided mass flow rate readings. The interpolated values for manufacturer recommended spark/phi/load limit, which are calculated from the updated BTU content and MN, are used to automatically adjust associated equipment. If static mode is enabled, the EICS initializes in the same manner as dynamic mode, but the values for BTU content, MN, and manufacturer recommended spark/phi/load limit remain constant relative to the base fuel. Static mode allows equipment adjustment that is determined by the one-time base fuel properties used to initialize the system. To simplify the conceptual difference, static mode allows wellhead fuel quality to be observed without making adjustments relative to said wellhead fuel quality. Application of the static mode would be valuable once the properties of a fuel source is determined and can be used as a base fuel for calibration. For example, a natural gas well in the Permian Basin of Texas may supply fuel of quality that differs from another geographical source, like the Eagle Ford Group in Texas. To elaborate further, calibration of the system can be based off a geographical fuel supply; relating to the previous example, natural gas from either the Permian Basin or Eagle Ford could be used as the calibrating base fuel.

If the methane number fuel trim feature is enabled, the air fuel ratio or "phi" can be adjusted accordingly. In dynamic mode, phi is adjusted according to MN interpolated using the closed loop error value and the fuel calibration table. If the interpolated MN is greater than or equal to the MN associated with the manufacturer recommended spark/phi specifications, phi is adjusted. The adjusted phi value generated from this system is used to make corrections in mass flow rate of gas or air. The correction values are demanded by the ECM 100 to the MFG 10 and MFA 140 throttles. In static mode, the interpolated MN value of the fuel source can simply be looked up from the fuel calibration table.

Spark advance values are controlled by the previously mentioned database program compensation mode. When the database program is enabled, manufacturer recommended values for spark advance, phi, and load limits can be used by the ECIS. The database program uses the closed loop error input to interpolate a spark advance value from the fuel table. After the spark advance is determined, the adjusted offset amount applied by the ECM 100 can be observed as well as the resulting spark advance from said adjusted offset amount.

The above method for determining spark advance is only enabled when the fuel quality control system is enabled. If the fuel quality control system is not enabled, the database program determines the spark advance based on a one time calibrated 0-100% range; natural gas has a database program value of 0% and liquid propane gas has a value of 100%. The database program percentage value depends if the fuel supply behaves more like natural gas or propane.

To control engine load limits, the fuel type must be NG and the fuel quality control system must be enabled. Determining the load limit is also done using the fuel table interpolation method. The closed loop error is entered as an input value and the load limits are interpolated based off the manufacturer's recommended values for the engine's load limit. After the load limits are determined, the fuel quality can be determined by interpolating values based off a response curve similar to the illustration in FIG. 13.

Throttle Control Strategy

As will be understood by those of skill in the art, the following mass flow rate equations are used to describe the non-choked flow of gases through an orifice. Equation (1) is the mass flow rate equation for ideal gases and equation (2) uses a gas compressibility factor "Z" to correct for the mass flow rate of real gases.

$$\dot{m} = CA_2 \sqrt{2\rho_1 P_1 \left(\frac{k}{k-1}\right)\left[(P_2/P_1)^{2/k} - (P_2/P_1)^{(k+1)/k}\right]} \quad (1)$$

$$\dot{m} = CA_2 P_1 \sqrt{\frac{2M}{ZRT_1}\left(\frac{k}{k-1}\right)\left[(P_2/P_1)^{2/k} - (P_2/P_1)^{(k+1)/k}\right]} \quad (2)$$

In these equations, "M" is the desired mass flow rate demanded by the ECM 100; "C" is the dimensionless orifice flow coefficient; "$A_2$" is the cross-sectional area of the orifice hole ("effective area"); "pi" is the upstream real gas density; "$P_1$" is the upstream gas pressure; "k" is specific heat ratio; "$P_2$" is the downstream gas pressure; "M" is the gas molecular mass; "$T_1$" is the absolute upstream gas temperature; "Z" is the dimensionless gas compressibility factor at "$P_1$" and "$T_1$"; and "R" is the universal gas law constant. Values for "Z" and "R" are unique to specific gases, or in the case of the current disclosure, a specific fuel type. These values can be held constant with respect to the calibrating base fuel. Values for "C" can be found using the pressure differential "deltaP" in the MFA or MFG throttle valve.

With reference to FIG. 10, the throttle control algorithm 990 determines the $A_2$ "effective area" needed to achieve the desired m mass flowrate using equation (2). The algorithm essentially rearranges equation (2) so that the effective area is calculated and correlated to the throttle blade angle. $P_2$, $P_1$, and $T_1$ are measured as previously described and these values are used in equation (2). Corrections to the mass flow can be correlated to "effective area" corrections needed to achieve the desired mass flow. The microcontroller 930 is constantly utilizing the throttle control algorithm 990 to attain precise m flowrates while the parameters change. Once the "effective area" $A_2$ is determined by throttle control algorithm 990, a signal is transmitted to brushless motor 700. Brushless motor 700 is an actuator that controls the movement of throttle shaft 710, thereby adjusting throttle blade 210 of gaseous supply throttle 20 until the desired "effective area" $A_2$ is achieved. Brushless motor 700 is preferably a fast-acting actuator, preferably operable to move the throttle blade 210 through its entire range of motion in fifty milliseconds or less. Fast-acting actuators are preferably operable to move the actuated element through most of its operable range of motion (preferably from 20% to 80% of stroke), if not all of that operable range, in fifty milliseconds or less, although many other types of actuators are still likely to be suitable as alternatives, especially to the extent particular claim elements are not expressly disclaimed to require particular fast-acting characteristics.

Operating Pressures—Low Pressure

Although it will be understood that adaptations may be made for other upstream conditions, the pressure in the supply line 376 at the supply inlet 390 is preferably controlled by mechanical pressure regulator 370 to be approximately at a gauge pressure slightly above one atmosphere, although when throttle 10 is used as an MFG throttle, pressures could be as high as 2.5 bar absolute or, in the case of MFA application, as high as four bar absolute.

Although not necessary for highly accurate mass flow control, some methods of controlling large engine throttle 10 may also be further tuned to achieve the desired control depending in part on actual or estimated fluid conditions even further downstream, such as by a downstream sensor 121 monitoring pressure (designated as "$P_3$" for our purposes) that is monitored by ECM 100 and for which a representative data signal 120 is continuously available from ECM 100 (or from the data network associated with ECM 100). The particular $P_3$ value of data signal 120 represents any available data stream from engine 102 that is characteristic of pre-combustion fluid pressure within engine 102. Such a downstream sensor 121 may be a conventional temperature and manifold absolute pressure (TMAP) sensor module located in the engine's intake manifold downstream from fuel-air throttle 140. In addition to, or as an alternative to, a conventional TMAP sensor 121, downstream data can also be gathered from a conventional throttle inlet pressure (TIP) sensor module upstream of fuel-air throttle 140. Again, though, despite the plausible benefits of knowing the further downstream pressure $P_3$ for some variations of the invention, most preferred embodiments of throttle 10 omit consideration of $P_3$ data from sensor 121 as unnecessary, opting instead for simplicity and cost saving.

Alternative Fuels

Gaseous fuel for these purposes means a fuel that is in the gaseous state at standard operating temperatures and pressures. In presently preferred embodiments, the gaseous fuel is natural gas, derived from either a liquefied natural gas (LNG) or compressed natural gas (CNG) storage state. While the most preferred embodiments are adapted for use with these fuels, adaptations will be evident to those of skill in the art for use of aspects of this invention with other fuels in alternative embodiments. Such alternative embodiments are adapted, for instance, for use with hydrogen or other gaseous fuels such as propane, butane or other gas mixtures, including those common with liquefied petroleum gas (LPG) mixtures. Indeed, although the present invention is focused on the particular fields to which the preferred embodiments apply, it may also well be that some aspects of the invention may be found revolutionary in other fields as well.

Power System in Use

FIG. 14 illustrates a hydrocarbon recovery system 1400 in which power unit system 1402 previously discussed is utilized. Specifically, engine 102 of system 1402 is operatively coupled with a pump 1404 by shaft 1406 to provide power to the pump 1404. Pump 1404 is configured to pump hydrocarbons from a natural hydrocarbons source 1408 through source line 1409. Specifically, in some embodiments, hydrocarbons source 1408 is a natural gas well located underground and pump 1404 is configured to pump natural gas from well 1408. Although those with skill in the art will understand that hydrocarbons source 1408 can be any well or natural source of hydrocarbons, throughout this application, hydrocarbons source 1408 will be referred to a natural gas well that pump 1404 is configured to pump natural gas from.

Pump 1404 is configured to pump natural gas from well 1408 to a destination 1410 through a destination line 1412. Those with skill in the art will understand that destination 1410 can be any of a number of points in a natural gas recovery system 1400. For example, in some embodiments, destination 1410 is a storage tank of natural gas from well 1408. In other embodiments, destination 1410 is a facility for refining natural gas from well 1408. In some embodiments, pump 1404 is also configured to pump natural gas through a supply line 1414 configured supply system 1402 with fuel to power engine 102. For example, in some embodiments, supply line 1414 is coupled with fuel tank 360, and is thus configured to maintain a certain natural gas fuel level within fuel tank 360 for supply fuel to engine 102. Accordingly, in some embodiments, 360 may be filled with a small amount of "starter fuel" to start operation of engine 102 to operate pump 1404. Once pump 1404 is started, the natural gas fuel level of fuel tank 360 is adequately maintained by natural gas supplied to fuel tank 360 by pump 1404.

In some embodiments, pump 1404 further include a pump control module (PCM) 1416 configured to control operation of pump 1404. PCM 1416 is configured to communicate with ECM 100 either by wired or wireless communication. As has been discussed, ECM 100 is configured to transmit various determinations to PCM 1416 so that PCM 1416 can use the transmitted determinations to more efficiently control operation of pump 1404. For example, in some embodiments, in the methods described in FIG. 11B, at step 460', ECM 100 is configured to transmit the inferred fuel properties to PCM 1416. As previously discussed in greater detail, and referencing FIGS. 11A-13, ECM 100 is configured to determine a certain fuel property value of natural gas (such as, for example, a BTU value) passing though MFG 10. Referencing FIG. 14, the gas supplied to MFG 10 is ultimately provided by pump 1404 pumping the natural gas from 1408. Accordingly, ECM 100 is configured to determine BTU values of the natural gas of well 1408. By PCM 1416 having access to the BTU values of the natural gas of well 1408, PCM 1416 can control pump 1404 based on the received property values (such as for example, BTU values) from ECM 100. Those with skill in the art will understand that it is desirable to know properties of fuel being pumped by pump 1404 so that pump 1404 settings and operation can be adjusted to most efficiently pump the natural gas.

Throttle Body Assembly with Annular Sensing Rinks

According to various embodiments of this disclosure, throttle body assembly 20, previously discussed in detail, further includes annular sensing rings 1500, 1510 which, as will become evident, further improve accuracy of pressure sensors 950-952. FIG. 15A and FIG. 15B illustrate downstream and upstream perspective views, respectively, of body assembly 20. An upstream sensing ring 1500 is disposed on an upstream side of valve body 22 within flow bore 24, and a downstream sensing ring 1510 is disposed on a downstream side of valve body 22 within the flow bore 24. As will be discussed in greater detail below, rings 1500 and 1510 are configured to form annuluses between the outer parts of the rings 100, and 1510 and the bore 24, and fluid flowing through the bore 24 fills the annuluses. Pressure ports 230, 240 are fluidly coupled within the annuluses and thus allows sensors 950-952 to take reading of fluid within the annuluses which provides pressure readings that are less position-dependent than readings directly from the fluid as it flows through the flow bore 24.

FIG. 16A illustrates a perspective view of upstream sensing ring 1500. Sensing ring 1500 has a shoulder portion 1502 which is seated within bore 24 and a recessed portion 1504 which has a smaller outer diameter when compared to outer diameter of shoulder portion 1502. Sensing ring 1500 further comprises a plurality of notches 1506 formed on the outer edge of recessed portion 1504 that, as discussed in greater detail below, allow for fluid flow between fluid passing though the bore 24 and the annulus formed between the sensing ring 1500 and the wall of bore 24.

FIG. 16B illustrates a perspective view of downstream sensing ring 1510. Sensing ring 1510 has a shoulder portion 1512 which is seated within bore 24 and a recessed portion 1514 which has a smaller outer diameter when compared to outer diameter of shoulder portion 1512. Sensing ring 1510 further comprises a plurality of through-holes 1506 formed in recessed portion 1504 that, as discussed in greater detail below, allow for fluid flow between fluid passing though the bore 24 and the annulus formed between the sensing ring 1510 and the wall of bore 24.

FIG. 17 illustrates a cross-sectional view of body assembly 20 with sensing rings 1500 and 1510 installed within bore 24. Specifically, sensing ring 1500 is installed in an upstream sensing ring seat 1530 of the bore 24. As previously mentioned, when sensing ring 1500 is positioned in place within seat 1530, an upstream annulus 1520 is formed by the wall of seat 1530, the outside wall of recessed portion 1504 and a downstream-facing edge wall of shoulder 1502. Fluid flowing through bore 24 flows into and out of annulus 1520 through openings formed by notches 1506 and seat 1530. As shown, sensor port 230 is in direct fluid communication with upstream annulus 1520.

Sensing ring 1510 is installed in a downstream sensing ring seat 1532 of the bore 24. As previously mentioned, when sensing ring 1510 is positioned in place within seat 1532, a downstream annulus 1522 is formed by the wall of seat 1532, the outside wall of recessed portion 1514 and an upstream-facing edge wall of shoulder 1512. Fluid flowing through bore 24 flows into and out of annulus 1520 through through-holes 1516. As shown, sensor port 240 is in direct fluid communication with downstream annulus 1522.

Those with skill in the art will understand the benefits that annuluses 1520, 1522 provided to sensors 950-952 in taking accurate pressure readings. Annulus 1500, 1520 create pockets of relatively "still" working fluid with an even pressure gradient for sensors 950-952 to measure. Without sensing rings 1500, 1510 installed, pressure readings would be taken directly from fluid flowing through bore 24, which has a variable pressure gradient throughout the cross-section of the bore 24 and thus can cause pressure reading to be position-dependent and an inaccurate representation of fluid passing through the bore 24.

Although sensing rings 1500 and 1510 are shown as being different from each other, those with skill in the art will understand that in other embodiments, the upstream and downstream sensing rings can be the same as each other. Further, in some embodiments, upstream sensing ring 1500 incorporates holes 1516, and in some embodiments, downstream sensing ring 1510 incorporates notches 1506. Still in other embodiments, rings 1500 and 1510 can incorporate different types of passageways to allow for fluid communication to annulus 1520, 1522. Although it is not shown in the cross-section illustrated in FIG. 17, those with skill in the art will understand in referencing FIG. 2B that, according to some embodiments, temperature sensor port 250 is also disposed in fluid communication with annulus 1520. Further, according to other embodiments, port 250 is also disposed in fluid communication with annulus 1520.

Alternatives in General

While the foregoing descriptions and drawings should enable one of ordinary skill to make and use what is presently considered to be the best mode of the invention, they should be regarded in an illustrative rather than a restrictive manner in all respects. Those of ordinary skill will understand and appreciate the existence of countless modifications, changes, variations, combinations, rearrangements, substitutions, alternatives, design choices, and equivalents ("Alternatives"), most if not all of which can be made without departing from the spirit and scope of the invention.

Therefore, the invention is not limited by the described embodiments and examples but, rather, encompasses all possible embodiments within the valid scope and spirit of the invention as claimed, as the claims may be amended, replaced or otherwise modified during the course of related prosecution. Any current, amended, or added claims should be interpreted to embrace all further modifications, changes, rearrangements, substitutions, alternatives, design choices, and embodiments that may be evident to those of skill in the art, whether now known or later discovered. For example, other alternatives associated with the current disclosure with one mass flow throttle may use a mass flow throttle that controls the mass flow of an air-fuel mixture, which for convenience may be referred to as MFA/MFG. Still alternatives will be evident to those of ordinary skill in the art. In any case, all equivalents should be considered within the scope of the invention, to the extent expressly disclaimed during prosecution or to the extent necessary for preserving validity of particular claims in light of the prior art.

What is claimed is:

1. A system for determining properties of fuel supplied to an internal combustion (IC) engine and for adjusting operations of the IC engine based on the determined properties to maximize performance, comprising:
   an air-flow throttle operatively coupled with an air-intake system of the IC engine and configured to control the amount of air supplied to the air-intake system;
   a fuel-flow throttle operatively coupled with the IC engine and configured to control the amount of fuel supplied to the IC engine; and
   an engine control module (ECM) operatively coupled with the air-flow throttle and the fuel-flow throttle to receive readings from and control operation of the throttles and configured to:
   perform a fuel-air determination program in which the ECM is configured to:
      determine a true air-to-fuel (AF) ratio based on readings from the air-flow throttle and the fuel-flow throttle, and
      compare the true AF ratio to an ideal AF ratio programmed to the ECM and determine a percent-error AF ratio based on the comparison, and
   perform a fuel property determination and adjustment program in which the ECM is configured to:
      determine a fuel property value of fuel supplied to the IC engine based on the percent-error AF ratio,
      adjust a load limit of the IC engine based on the determined fuel property value, and
      adjust a spark plug timing sequence of the IC engine based on the determined fuel property value.

2. The system of claim 1, wherein, in performing the fuel-air determination program, the ECM is further configured to:
   determine an air-flowrate of air passing through the air-flow throttle;
   determine a fuel-flowrate of fuel passing through the fuel-flow throttle;
   determine the true AF ratio using the determined air-flowrate and the determined fuel-flowrate;
   determine correction values for the air-flow throttle and the fuel-flow throttle using the percent-error AF ratio and reading from an oxygen sensor of the IC engine;

in response to the correction values being different than zero, adjust the air-flow throttle and the fuel-flow throttle based on determined correction values and restart the fuel-air determination program; and in response to the correction values being zero, stop the fuel-air determination program and perform the fuel property determination and adjustment program.

3. The system of claim 2, wherein:

assumed properties of air supplied to the IC engine and of fuel supplied to the IC engine are stored on the ECM;

in determining the air-flowrate, the ECM is configured to determine a mass-air-flowrate of the air using the assumed properties; and in determining the fuel-flowrate, the ECM is configured to determine a mas s-fuel-flowrate of the fuel using the assumed properties.

4. The system of claim 3, wherein the assumed properties include an assumed Stoichiometric AF ratio, an assumed specific gravity of the fuel, and a ratio of specific heats of the air and the fuel.

5. The system of claim 1, wherein the fuel supplied to the IC engine is natural gas and the fuel property value is a British Thermal Unit (BTU) value of the natural gas.

6. The system of claim 1, wherein, in the determining of the fuel property value of fuel supplied to the IC engine based on the percent-error AF ratio, the ECM utilizes a database stored to the ECM relating percent-error AF ratios to fuel property values.

7. The system of claim 1, wherein, in the adjusting of the load limit of the IC engine, the ECM is configured to reduce a total power output of the IC engine by restricting the fuel or air supplied to the IC engine by the air-flow throttle or the fuel-flow throttle.

8. The system of claim 1, wherein, in the adjusting of the load limit of the IC engine, the ECM is configured to reduce the load limit by an amount proportional to the amount by which the determined fuel property value is different from an ideal fuel property value.

9. The system of claim 1, wherein, in the adjusting of the spark plug timing sequence of the IC engine, the ECM is configured to adjust the spark plug timing sequence by an amount proportional to the amount by which the determined fuel property value is different from an ideal fuel property value.

10. The system of claim 1, wherein:

the fuel supplied to the IC engine is natural gas;

the fuel property value is a British Thermal Unit (BTU) value of the natural gas;

the IC engine is operatively coupled with a pump configured to pump the natural gas from a natural gas source; and the ECM is configured to transmit the BTU value of the natural gas to a controller of the pump.

11. A system for determining properties of fuel supplied to an internal combustion (IC) engine and for adjusting operations of the IC engine based on the determined properties to maximize performance, comprising:

an air-flow throttle operatively coupled with an air-intake system of the IC engine and configured to control the amount of air supplied to the air-intake system;

a fuel-flow throttle operatively coupled with the IC engine and configured to control the amount of fuel supplied to the IC engine;

an engine control module (ECM) operatively coupled with the air-flow throttle and the fuel-flow throttle to receive readings from and control operation of the throttles and configured to:

perform a fuel-air determination loop in which the ECM is configured to:

determine an air-flowrate of air passing through the air-flow throttle, determine a fuel-flowrate of fuel passing through the fuel-flow throttle, determine a true air-to-fuel (AF) ratio using the determined air-flowrate and the determined fuel-flowrate, compare the true AF ratio to an ideal AF ratio programmed to the ECM and determine a percent-error AF ratio based on the comparison, determine correction values for the air-flow throttle and the fuel-flow throttle using the percent-error AF ratio and readings from an oxygen sensor of the IC engine, in response to the correction values being different than zero, adjust the air-flow throttle and the fuel-flow throttle based on determined correction values and restart the fuel-air determination loop, and in response to the correction values being zero, stop the fuel-air determination loop and perform a fuel property determination and adjustment program in which the ECM is configured to adjust operations of the IC engine based on a fuel property value of the fuel supplied to the IC engine.

12. The system of claim 11, wherein:

assumed properties of air supplied to the IC engine and of fuel supplied to the IC engine are stored on the ECM;

in determining the air-flowrate, the ECM is configured to determine a mass-air-flowrate of the air using the assumed properties; and in determining the fuel-flowrate, the ECM is configured to determine a mas s-fuel-flowrate of the fuel using the assumed properties.

13. The system of claim 12, wherein the assumed properties include an assumed Stoichiometric AF ratio, an assumed specific gravity of the fuel, and a ratio of specific heats of the air and the fuel.

14. The system of claim 11, wherein the fuel supplied to the IC engine is natural gas and the fuel property value is a British Thermal Unit (BTU) value of the natural gas.

15. The system of claim 11, wherein, in performing the fuel property determination and adjustment program, the ECM is configured to:

determine the fuel property value of fuel supplied to the IC engine based on the percent-error AF ratio;

adjust a load limit of the IC engine based on the determined fuel property value; and adjust a spark plug timing sequence of the IC engine based on the determined fuel property value.

16. The system of claim 15, wherein, in the determining of the fuel property value of fuel supplied to the IC engine based on the percent-error AF ratio, the ECM utilizes a database stored to the ECM relating percent-error AF ratios to fuel property values.

17. The system of claim 15, wherein, in the adjusting of the load limit of the IC engine, the ECM is configured to reduce a total power output of the IC engine by restricting the fuel or air supplied to the IC engine by the air-flow throttle or the fuel-flow throttle.

18. The system of claim 15, wherein, in the adjusting of the load limit of the IC engine, the ECM is configured to reduce the load limit by an amount proportional to the amount by which the determined fuel property value is different from an ideal fuel property value.

19. The system of claim 15, wherein, in the adjusting of the spark plug timing sequence of the IC engine, the ECM is configured to adjust the spark plug timing sequence by an amount proportional to the amount by which the determined fuel property value is different from an ideal fuel property value.

20. A system for determining properties of fuel supplied to an internal combustion (IC) engine and for adjusting operations of the IC engine based on the determined properties to maximize performance, comprising:
- an air-flow throttle operatively coupled with an air-intake system of the IC engine and configured to control the amount of air supplied to the air-intake system;
- a fuel-flow throttle operatively coupled with IC engine and configured to control the amount of fuel supplied to the IC engine;
- an engine control module (ECM) operatively coupled with the air-flow throttle and the fuel-flow throttle to receive readings from and control operation of the throttles and configured to:
  - perform a fuel-air determination loop in which the ECM is configured to:
    - determine an air-flowrate of air passing through the air-flow,
    - determine a fuel-flowrate of fuel passing through the fuel-flow throttle,
    - determine a true air-to-fuel (AF) ratio using the determined air-flowrate and the determined fuel-flowrate,
    - compare the true AF ratio to an ideal AF ratio programmed to the ECM and determine a percent-error AF ratio based on the comparison,
    - determine correction values for the air-flow throttle and the fuel-flow throttle using the percent-error AF ratio and readings from an oxygen sensor of the IC engine,
    - in response to the correction values being different than zero, adjust the air-flow throttle and the fuel-flow throttle based on determined correction values and restart the fuel-air determination loop, and
    - in response to the correction values being zero, stop the fuel-air determination loop and perform a fuel property determination and adjustment program,
  - wherein, in performing the fuel property determination and adjustment program, the ECM is configured to:
    - determine a fuel property value of fuel supplied to the IC engine based on the percent-error AF ratio,
    - adjust a load limit of the IC engine based on the determined fuel property; and
    - adjust a spark plug timing sequence of the IC engine based on the determined fuel property.

* * * * *